United States Patent
Liu et al.

(10) Patent No.: US 11,943,359 B2
(45) Date of Patent: Mar. 26, 2024

(54) SECURE COMPUTE NETWORK DEVICES AND METHODS

(71) Applicant: Huawei Technologies Co., Ltd., Shenzhen (CN)

(72) Inventors: Fei Liu, Plano, TX (US); Jun Xu, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 309 days.

(21) Appl. No.: 17/359,108

(22) Filed: Jun. 25, 2021

(65) Prior Publication Data

US 2021/0328798 A1 Oct. 21, 2021

Related U.S. Application Data

(63) Continuation of application No. PCT/CN2019/083567, filed on Apr. 20, 2019.

(60) Provisional application No. 62/810,730, filed on Feb. 26, 2019.

(51) Int. Cl.
*H04L 9/32* (2006.01)
*H04L 9/00* (2022.01)
*H04L 9/08* (2006.01)
*H04L 9/40* (2022.01)
*H04L 61/4517* (2022.01)
(Continued)

(52) U.S. Cl.
CPC .......... *H04L 9/3221* (2013.01); *H04L 9/0825* (2013.01); *H04L 9/3218* (2013.01); *H04L 9/3247* (2013.01); *H04L 61/4517* (2022.05); *H04L 63/12* (2013.01); *G06F 21/645* (2013.01); *G06F 21/71* (2013.01); *H04L 9/0897* (2013.01); *H04L 9/3239* (2013.01); *H04L 9/50* (2022.05)

(58) Field of Classification Search
CPC ....... H04L 9/08; H04L 9/0816; H04L 9/0819; H04L 9/0825; H04L 9/0894; H04L 9/0897; H04L 9/32; H04L 9/3218; H04L 9/3247; H04L 9/3236; H04L 9/3239; H04L 9/50; H04L 63/12; G06F 21/60; G06F 21/64; G06F 21/645; G06F 21/70; G06F 21/71

See application file for complete search history.

(56) References Cited

U.S. PATENT DOCUMENTS

| | | | |
|---|---|---|---|
| 11,240,001 B2* | 2/2022 | Elkhiyaoui | G06Q 20/389 |
| 2013/0097417 A1 | 4/2013 | Lauter et al. | |
| 2014/0109190 A1 | 4/2014 | Cam-Winget et al. | |

(Continued)

FOREIGN PATENT DOCUMENTS

CN 105960781 A 9/2016

*Primary Examiner* — D'Arcy Winston Straub
(74) *Attorney, Agent, or Firm* — Conley Rose, P.C.

(57) ABSTRACT

The disclosure relates to technology for secure compute. One aspect includes a network device, comprising a non-transitory memory comprising instructions; and one or more processors in communication with the non-transitory memory storage. The one or more processors execute the instructions to receive and process routing requests in a network; send an indication into the network that the network device is able to perform secure computes; perform a secure compute based on an input received via the network from an input device; ensure that a result of the secure compute is trusted as a correct result of the secure compute; and provide the trusted result of the secure compute to a result device connected to the network.

20 Claims, 16 Drawing Sheets

(51) Int. Cl.
    *G06F 21/64*          (2013.01)
    *G06F 21/71*          (2013.01)

(56) References Cited

U.S. PATENT DOCUMENTS

| | | |
|---|---|---|
| 2015/0229618 A1 | 8/2015 | Wan et al. |
| 2017/0185804 A1 | 6/2017 | Elbaz et al. |
| 2017/0310583 A1 | 10/2017 | Bernstein et al. |
| 2018/0324258 A1 | 11/2018 | Wang |
| 2020/0119925 A1* | 4/2020 | Wang ................ G06Q 20/3827 |
| 2022/0038289 A1* | 2/2022 | Huang ................ G06F 16/27 |

* cited by examiner

SECURE COMPUTE NETWORK DEVICES AND METHODS

CROSS-REFERENCE TO RELATED APPLICATIONS

This application is a continuation of International Patent Application No. PCT/CN2019/083567 filed on Apr. 20, 2019, by Huawei Technologies Co., Ltd., and titled "Secure Compute Network Devices And Methods," which claims the benefit of U.S. Provisional Patent Application No. 62/810,730 filed on Feb. 26, 2019, and titled "Secure Compute Network Devices and Methods," each of which is hereby incorporated by reference.

TECHNICAL FIELD

The disclosure generally relates to secure compute network devices and methods.

BACKGROUND

Secure compute (also known as privacy-preserving compute) is a subfield of cryptography with the goal of creating methods for computing a result for some input(s) while keeping the input(s) private. One example of a secure compute is a zero-knowledge proof (also referred to as a zero-knowledge protocol). A zero-knowledge proof is a method by which one party (the prover) can prove to another party (the verifier) that the prover knows a value "x", without conveying any information apart from the fact that the prover knows the value of "x". Thus, the zero-knowledge proof allows the prover to prove that they know the value of "x" without revealing the value of "x" to the verifier.

SUMMARY

According to one aspect of the present disclosure, there is provided a network device, comprising a non-transitory memory storage comprising instructions; and one or more processors in communication with the non-transitory memory storage. The one or more processors execute the instructions to receive and process routing requests in a network. The one or more processors execute the instructions to send an indication into the network that the network device is able to perform a type of secure compute. The one or more processors execute the instructions to perform the type of secure compute based on an input received via the network from an input device. The one or more processors execute the instructions to ensure that a result of the secure compute is trusted as a correct result of the secure compute. The one or more processors execute the instructions to provide the trusted result of the secure compute to a result device connected to the network.

Optionally, in any of the preceding aspects, to ensure that the result of the secure compute is trusted, the one or more processors execute the instructions to act as a peer to generate the trusted result, by the network device, with other network devices in the network that performed the secure compute.

Optionally, in any of the preceding aspects, to provide the trusted result of the secure compute to a result device, the one or more processors execute the instructions to record the trusted result in a blockchain ledger.

Optionally, in any of the preceding aspects, to ensure that the result of the secure compute is trusted the one or more processors execute the instructions to notarize results of the secure compute from a plurality of network devices to produce the trusted result.

Optionally, in any of the preceding aspects, to ensure that the result of the secure compute is trusted, the one or more processors execute the instructions in a trusted execution environment (TEE).

Optionally, in any of the preceding aspects, to send the indication into the network that the network device is able to perform the type of secure compute, the one or more processors execute the instructions to: receive a query, via the network, whether the network device is able to perform the type of secure compute; and respond to the query to indicate that the network device is able to perform the type of secure compute.

Optionally, in any of the preceding aspects, to send the indication into the network that the network device is able to perform the type of secure compute, the one or more processors execute the instructions to add information to a header of a packet when processing the routing requests.

Optionally, in any of the preceding aspects, the input from the input device comprises a zero-knowledge proof.

Optionally, in any of the preceding aspects, to perform the secure compute the one or more processors execute the instructions to verify correctness of the zero-knowledge proof, based on a verification protocol.

Optionally, in any of the preceding aspects to provide the trusted result of the secure compute to the result device the one or more processors execute the instructions to: return a result of true to the result device in response to the zero-knowledge proof being correct; and return a result of false to the result device in response to the zero-knowledge proof being incorrect.

Optionally, in any of the preceding aspects to process routing requests in a network the one or more processors execute the instructions to route packets in accordance with an Open System Interconnection (OSI) layer 3 protocol.

Optionally, in any of the preceding aspects to process routing requests in a network the one or more processors execute the instructions to deliver frames in accordance with an Open System Interconnection (OSI) layer 2 protocol.

Optionally, in any of the preceding aspects the input received via the network from the input device is encrypted. The one or more processors execute the instructions to perform the secure compute without decrypting the input. This allows the input device to keep information private.

Optionally, in any of the preceding aspects, the network device further comprises a secure compute accelerator configured to perform the secure compute.

According to one other aspect of the present disclosure, there is provided a computer-implemented method for secure computing. The method comprises receiving and processing, by a network device, routing requests in a network; sending an indication, by the network device, into the network that the network device is able to perform a type of secure compute; performing the type of secure compute, by the network device, based on an input received via the network from an input device; ensuring, by the network device, that a result of the secure compute is trusted as a correct result of the secure compute; and providing the trusted result of the secure compute from the network device to a result device connected to the network.

According to still one other aspect of the present disclosure, there is provided a non-transitory computer-readable medium storing computer instructions for secure computing, that when executed by one or more processors, cause the one or more processors to: receive and process routing requests in a network by a network device; send an indication into the network that the network device is able to perform a type of secure compute; perform the type of secure compute based on an input received via the network from an input device; ensure that a result of the secure compute is trusted as a correct result of the secure compute; and provide the trusted result of the secure compute to a result device connected to the network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

Figure 1:
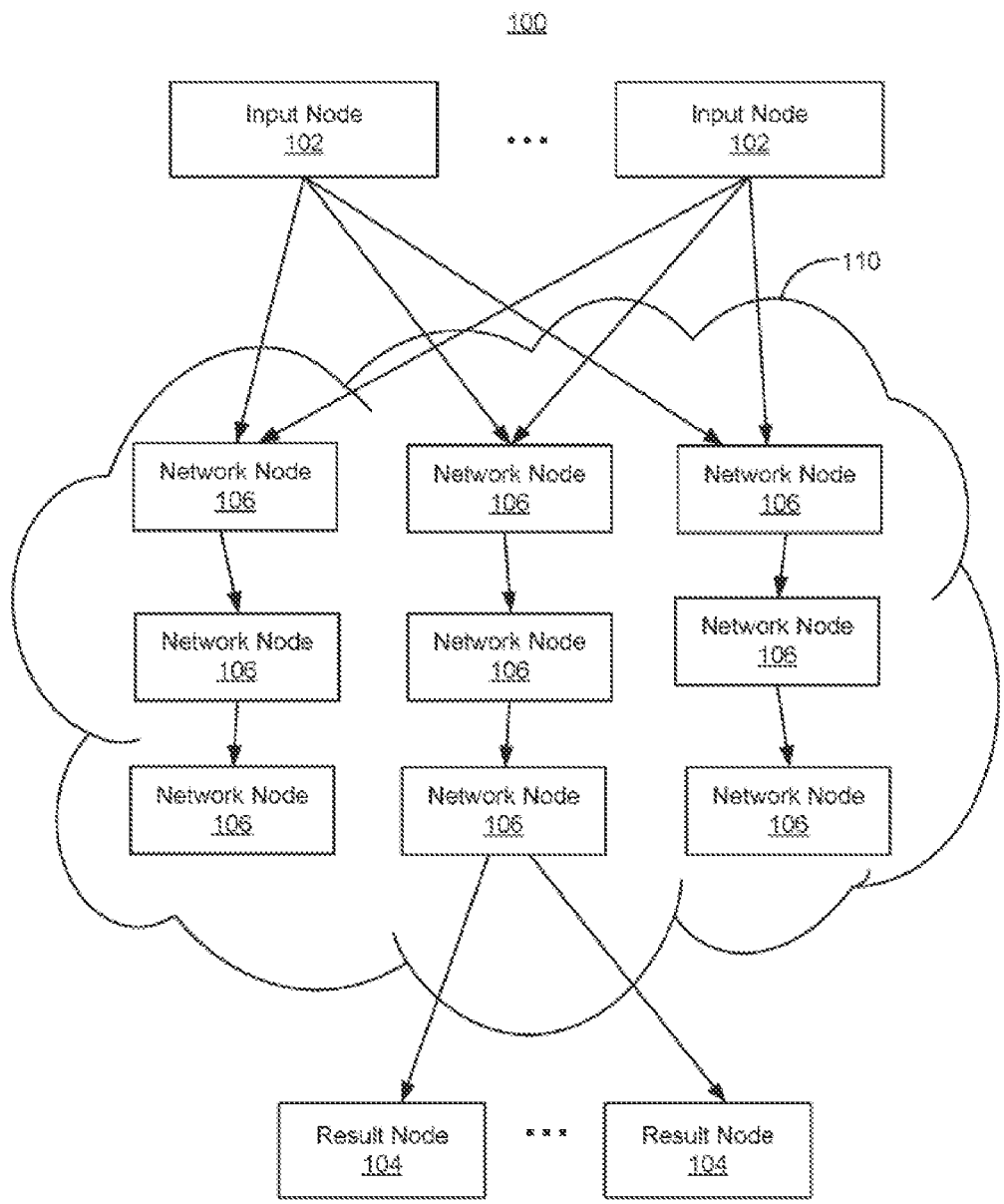
FIG. 1 illustrates a communication system in which embodiments may be practiced.

The present disclosure will now be described with reference to the figures, which in general relate to secure compute network devices, systems, and methods. A network device (also referred to herein as a "network node") may include, but is not limited to, a router or a switch.

Secure compute (also known as privacy-preserving compute) is a subfield of cryptography with the goal of creating methods for computing a result for some input(s) while keeping the input(s) private. One type of a secure compute is a zero-knowledge proof (also referred to as a zero-knowledge protocol). In one embodiment, a network node acts as a "verifier" by verifying whether a zero-knowledge proof that was generated by an input node is correct. Three requirements are met by a zero-knowledge protocol: completeness, soundness, and zero-knowledge. In this context, completeness means that if the input is true, the zero-knowledge proof always returns "true." Soundness means that if the input is false, it is not possible to trick the zero-knowledge proof to return "true." Zero knowledge means that if the statement is true, the verifier will have no idea what the statement actually is.

Another type of a secure compute is a secure multi-party computation (MPC). An MPC protocol allows n "players" to compute a function of their data while maintaining the privacy of their data. A network node computes some function of the data, without the input nodes revealing their data, in one embodiment. For example, two entities that have confidential patient data could perform joint research on the patient data without revealing the confidential patient information. Thus, the network node performs a secure MPC, in one embodiment.

Embodiments are not limited to the type of a secure compute being a zero-knowledge proof or a secure multi-party computation. Other types of privacy preserving computes can be implemented.

The one or more parties (which are referred to herein as "input nodes") encrypt information that is desired to be kept private before sending the encrypted information to one or more network nodes, in one embodiment. The one or more network nodes perform the secure compute without decrypting the encrypted information, in one embodiment. Therefore, the one more network nodes may determine a result of the secure compute while maintaining the privacy of the one or more party's information A significant challenge in implementing a secure compute, such as a zero-knowledge proof or an MPC is that it may take a relatively large amount of computer memory and or computation time, which can make it difficult to provide a practical implementation. Embodiments in which the secure compute is performed by a network node move the burden of performing the secure compute from electronic devices that either do not have the computation power and/or for which performing the secure compute would be too burdensome.

Another significant challenge in implementing a secure compute is to prevent dis-honest entities from attempting to produce an incorrect result of the secure compute. A secure compute has one correct result, as defined herein. However, dis-honest entities could attempt to force an incorrect result. The one or more network nodes that perform the secure compute provide some mechanism to ensure that the result of the secure compute can be trusted to be a correct result, in one embodiment. Herein, a "trusted result" means that the result of the secure compute can be trusted to be a correct result. Examples of mechanisms to ensure that the result of the secure compute can be trusted to be a correct result include, but are not limited to, multiple network nodes acting as peer nodes to generate a trusted result, notarizing results of the secure compute from multiple network devices to produce the trusted result, and/or performing the secure compute in a trusted execution environment (TEE).

Additionally, routing traffic can be reduced by selection of which network node(s) perform the secure compute.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1 illustrates a communication system 100 in which embodiments may be practiced. The communication system 100 includes one or more input nodes 102 (also referred to as "input device"), one or more result nodes (also referred to as "result device") 104, and a number of network nodes (also referred to as "network devices") 106. The network nodes 106 reside in one or more networks 110. The network nodes 106 may be routers, switches, etc. At least one of the network nodes 106 is configured to perform a secure compute. A secure compute has one or more inputs and at least one result, in one embodiment. An input node 102 is a node that provides an input to the secure compute. One or more input nodes 102 may provide different inputs to the secure compute, when there are two or more inputs. A result node 104 is a node that receives a result of the secure compute. Thus, the terms "input node" and "result node" refer to the role that the respective nodes play in the secure computes. A node might be an input node with respect to one secure compute and a result node with respect to another secure compute. It is possible for a node to be both an input node and a result node with respect to the same secure compute, when there are more than one input nodes for that secure compute.

An input node 102 or a result node 104 could be user equipment (UE) including, but not limited to, wireless transmit/receive unit (UE), mobile station, fixed or mobile subscriber unit, pager, cellular telephone, personal digital assistant (PDA), smartphone, laptop, computer, touchpad, wireless sensor, wearable devices or consumer electronics device. An input node 102 or a result node 104 could be a web server. An input node 102 may also be referred to herein as an input device, which is understood to be an electronic device such as a UE or web server. A result node 104 may also be referred to herein as a result device, which is understood to be an electronic device such as a UE or web server.

The network nodes 106 are configured to receive and process routing requests in the network 110. A network node 106 may include, for example, a router or a switch. In one embodiment, a network node 106 routes packets between two nodes (e.g., between two input nodes 102, between an input node 102 and a result node 104, between two result nodes 104) in accordance with an Open System Interconnection (OSI) network layer (or layer 3) protocol. In one embodiment, a network node 106 delivers frames between two nodes in accordance with an Open System Interconnection (OSI) link layer (or layer 2) protocol. The network nodes 106 are not limited to these examples for receiving and processing routing requests in the network 110. For example, in a multi-protocol label switching (MPLS) embodiment, an MPLS header can be added between the network layer header (i.e., the layer 3 header) and the link layer header (i.e., the layer 2 header) of the Open Systems Interconnection model (OSI model). Because MPLS often operates at a layer that is generally considered to lie between the traditional definitions of OSI Layer 2 (data link layer) and Layer 3 (network layer), MPLS is often referred to as a layer 2.5 protocol.

At least one of the network nodes 106 is configured to perform a type of secure compute, in one embodiment. The secure compute may also be referred to herein as "privacy-preserving compute." One type of a secure compute is a zero-knowledge proof (also referred to as a zero-knowledge protocol). Zero-knowledge protocols are known to those of ordinary skill in the art. It is not required that all of the network nodes 106 be able to perform the secure compute. In one embodiment, an input node 102 or a result node 104 sends a request (or query) into the network 110 to look for one or more network nodes 106 that are capable of performing the type of secure compute. The sender of the query (e.g., input node 102 or result node 104) selects one or more of network nodes 106 to perform the secure compute. Note that there may be many types of zero-knowledge proof. For example, there may be many different protocols for computing and verifying a zero-knowledge proof. Hence, the sender of the query may look for one or more network nodes 106 that are capable of performing the particular type of zero-knowledge protocol.

A zero-knowledge proof may be considered to be a secure two-party computation, where the verifier (e.g., network node 106) verifies the validity of a statement by the prover (e.g., input node 102). This concept can be extended to secure multiparty computation (MPC). An MPC protocol allows n "players" to compute a function of their inputs while maintaining the privacy of their inputs. One example of a secure multiparty computation is referred to as a secure sum protocol, which allows multiple parties to compute a function of their individual data without revealing the data to one another. As one example, party A has data x1, party B has data x2, and party C has data x2. Each of the parties may be a different input node 102. A network node 106 computes some function of the data, without the inputs nodes 102 revealing their data. For example, two entities that have confidential patient data could perform joint research on the patient data without revealing the confidential patient information. Thus, the network node 106 performs a secure multiparty computation, in one embodiment. Techniques for secure multiparty computation are known to those of ordinary skill in the art.

As noted, the secure compute may have one or more inputs, from a corresponding one or more input nodes 102. Each of the input nodes that has an input for the secure compute sends its input to each of the selected network nodes 106, in one embodiment. After the one or more selected network nodes 106 perform the secure compute, the result of the secure compute is provided to the result node(s) 104. The network nodes 106 are configured to ensure that the result of the secure compute is trusted in one embodiment. In other words, the network nodes 106 are configured to ensure that the result of the secure compute is the correct result. Further details of how the network nodes 106 ensure that the result is trusted are described herein.

The following example of a secure compute will be used for purpose of illustration. An input node 102 might be a computer laptop and a result node 104 might be a web server. A user of the computer laptop might be making a purchase on an e-commerce server that includes the web server. One of the network nodes 106 may perform a secure compute related to the purchase. An example of the secure compute is for the network node 106 to verify that the user of the laptop has sufficient monetary funds to make the purchase. This transaction could involve blockchain technology; however, the use of blockchain technology is not required.

The network node(s) 106 could perform any type of secure compute. The secure compute allows the input node 102 (or nodes) to keep some input information private, while still allowing the result node 104 to be certain with respect to the input information. For example, the input node 102 could keep private the total amount of money that a user has in an account, while still assuring the result node 104 that the user has sufficient funds to make a purchase. In one embodiment, the input nodes 102 keep their information private by encrypting the information before sending it to the network node(s) 106. The network node(s) 106 are able to generate a result for the secure compute without decrypting the information, in one embodiment.

In some cases, the secure compute involves more than one input node 102. An example of this is what is sometimes referred to as "the millionaire's problem." In one version of the millionaire's problem, two or more people want to determine who has more wealth without revealing their exact wealth to anyone. More generally, this can be viewed as the problem of comparing two numbers to determine which is larger without revealing the actual value of either number. There are many practical applications of this problem. One practical example is if a buyer only wishes to pay a certain amount and a seller wants to sell for some minimum amount, but neither wishes to reveal their respective amounts. One or more of the network nodes 106 performs a secure compute with respect to these or other problems, which keeps certain inputs from the input nodes 102 private. For example, a network node 106 could determine which of two people has more wealth without either person revealing their wealth to the network node 106.

In one embodiment, a single network node 106 performs the secure compute. The network node 106 has a trusted execution environment (TEE), in one embodiment. The secure compute is performed in the TEE, in one embodiment. A TEE is a secure area of a main processor, in one embodiment. A TEE guarantees code and data loaded inside are protected with respect to confidentiality and integrity, in one embodiment. Examples of TEE include, but are not limited to, AMD Platform Security Processor (PSP), ARM TrustZone® Technology, Intel Trusted Execution Technology, and MultiZone® Security Trusted Execution Environment. The network node 106 may send the result to a result node 104. Thus, in this manner a network node 106 may provide the result to the result node 104. Moreover, the result node 104 can trust the result to be the correct result due to the use of, for example, the TEE. Note that a security mechanism other than a TEE can be used in conjunction with the network node 106.

In one embodiment, two or more network nodes 106 perform the same secure compute. Each network node 106 may provide its result of the secure compute to one of the nodes, which may serve as a "notary node". The notary node may compare the results to determine a final result. For example, if all of the results match, the results may be considered to be the final result, in one embodiment. If the results do not match, the results may be discarded, or a majority of the results may be considered to be the final result in one embodiment. The notary node is one of the network nodes 106, in one embodiment. The notary node could be a node that is not a network node 106, in which case, two or more network nodes 106 send their respective results to the notary node to be notarized, in one embodiment. The notary node could be the result node 104, in which case, two or more network nodes 106 send their respective results to the result node 104 to be notarized, in one embodiment. Moreover, the result node 104 can trust the result to be the correct result due to, for example, the consensus mechanism provided by the notary node.

In one embodiment, two or more network nodes 106 acts as peer nodes (or more simply "peers") to ensure that the result of the secure compute is trusted to be the correct result. Each node may perform the secure compute. The network nodes 106 may act as peers and compare their results. For example, two or more network nodes 106 act as peers in a blockchain network. A blockchain network is comprised of peer nodes, each of which can hold copies of ledger. Thus, a network node 106 holds of copy of a blockchain ledger, in one embodiment. The result of the secure compute is recorded in a blockchain ledger, in one embodiment. The result node 104 obtains the result from the blockchain ledger, in one embodiment. Thus, in this manner one or more network nodes 106 may provide the result to the result node 104. Moreover, the result node 104 can trust the result to be correct, for example, the consensus mechanism provided by the network nodes 106 acting as peers.

Although FIG. 1 illustrates one example of a communication system, various changes may be made to FIG. 1. For example, the communication system 100 could include any number of input nodes 102, network nodes 106, result nodes 104, or other components in any suitable configuration.

Figure 2:
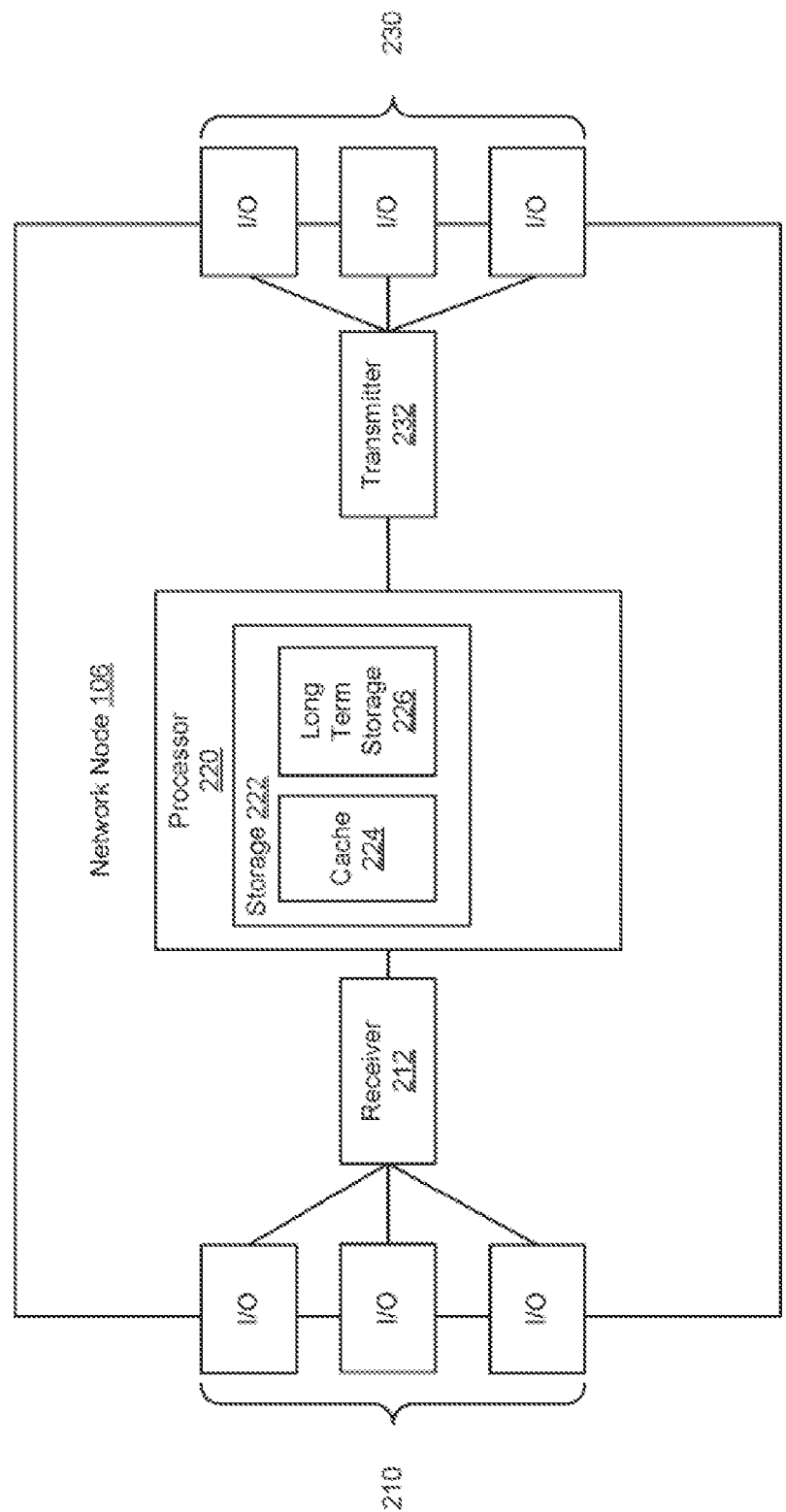
FIG. 2 illustrates an embodiment of a network node in accordance with embodiments of the disclosure.

FIG. 2 illustrates an embodiment of a network node (e.g., router) in accordance with embodiments of the disclosure. The network node 106 may comprise a plurality of input/output ports 210/230 and/or receivers (Rx) 212 and transmitters (Tx) 232 for receiving and transmitting data from other nodes, a processor 220, including a storage 222, to process data and determine which node to send the data. Although illustrated as a single processor, the processor 220 is not so limited and may comprise multiple processors. The processor 220 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 220 may be configured to implement any of the schemes described herein using any one or combination of steps described in the embodiments. In some embodiments, the processor 220 is configured to perform a secure compute. Moreover, the processor 220 may be implemented using hardware, software, or both.

The storage 222 (or memory) may include cache 224 and long-term storage 226, and may be configured to store routing tables, forwarding tables, or other tables or information disclosed herein. Although illustrated as a single storage, storage 222 may be implemented as a combination of read only memory (ROM), random access memory (RAM), or secondary storage (e.g., one or more disk drives or tape drives used for non-volatile storage of data). The storage 222 contains instructions that may be executed on the processor 220 in order to perform a secure compute, in one embodiment.

Figure 3:
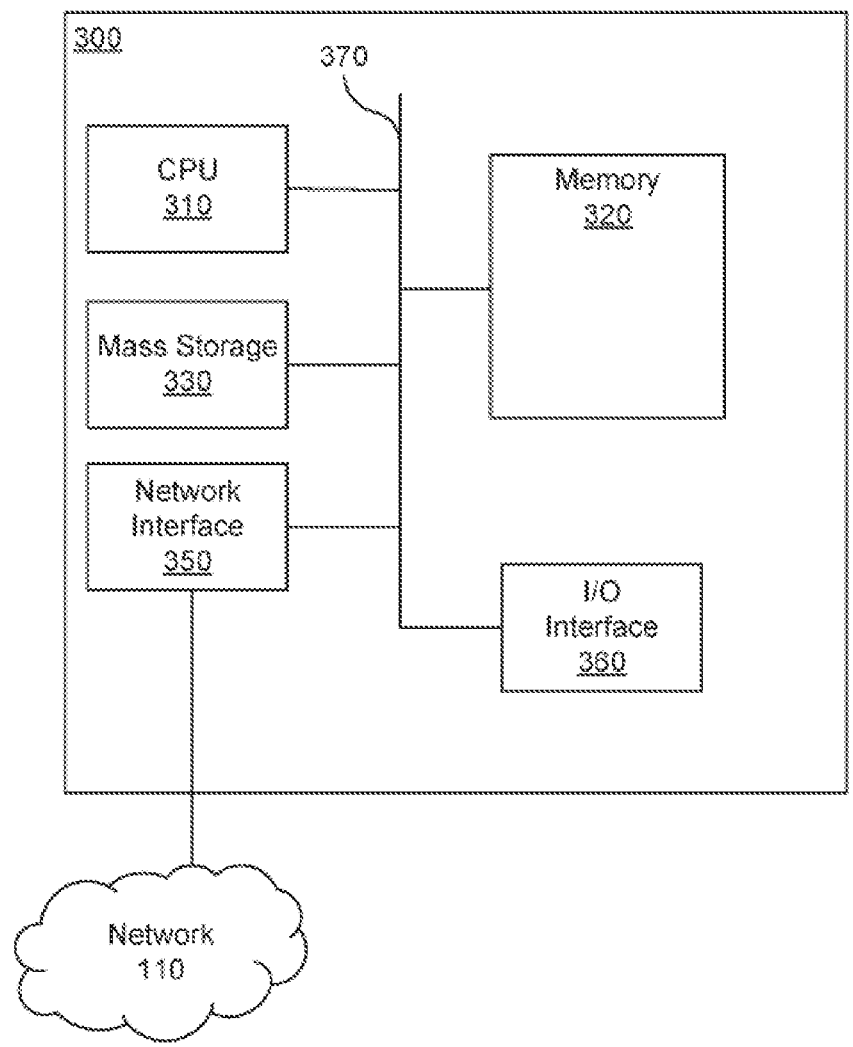
FIG. 3 illustrates a high level block diagram of a computing system.

FIG. 3 illustrates high level block diagram of a computing system 300. The computing system 300 may be used to implement an input node 102, a result node 104, or a network node 106. Specific devices may utilize all of the components shown, or only a subset of the components, and levels of integration may vary from device to device. Furthermore, a device may contain multiple instances of a component, such as multiple processing units, processors, memories, transmitters, receivers, etc.

The computing system 300 may comprise one or more input/output devices, such as network interfaces, storage interfaces, and the like. The computing system 300 may include a central processing unit (CPU) 310, a memory 320, amass storage device 330, and an I/O interface 360 connected to a bus 370. The bus may be one or more of any type of several bus architectures including a memory bus or memory controller, a peripheral bus or the like.

The CPU 310 may comprise any type of electronic data processor. The CPU 310 may be configured to implement any of the schemes described herein, using any one or combination of steps described in the embodiments. The memory 320 may comprise any type of system memory such as static random access memory (SRAM), dynamic random access memory (DRAM), synchronous DRAM (SDRAM), read-only memory (ROM), a combination thereof, or the like. In an embodiment, the memory 320 may include ROM for use at boot-up, and DRAM for program and data storage for use while executing programs.

In embodiments, the memory 320 is non-transitory. The memory 320 is a non-transitory computer-readable medium storing computer instructions, that when executed by the CPU 310, cause the one or more processors to perform various functionality described herein. In one embodiment, the memory 320 comprises software modules that may be executed on the CPU 310.

The mass storage device 330 may comprise any type of storage device configured to store data, programs, and other information and to make the data, programs, and other information accessible via the bus. The mass storage device 330 may comprise, for example, one or more of a solid state drive, hard disk drive, a magnetic disk drive, an optical disk drive, or the like.

The computing system 300 also includes one or more network interfaces 350, which may comprise wired links, such as an Ethernet cable or the like, and/or wireless links to access nodes or one or more networks 110. The network interface 350 allows the computing system 300 to communicate with remote units via the network 110. For example, the network interface 350 may provide wireless communication via one or more transmitters/transmit antennas and one or more receivers/receive antennas. In an embodiment, computing system 300 is coupled to a local-area network or a wide-area network for data processing and communications with remote devices, such as other processing units, the Internet, remote storage facilities, or the like. Herein, the term "network interface" will be understood to include a port.

The components depicted in the computing system of FIG. 3 are those typically found in computing systems suitable for use with the technology described herein, and are intended to represent a broad category of such computer components that are well known in the art. Many different bus configurations, network platforms, and operating systems can be used.

Figure 4:
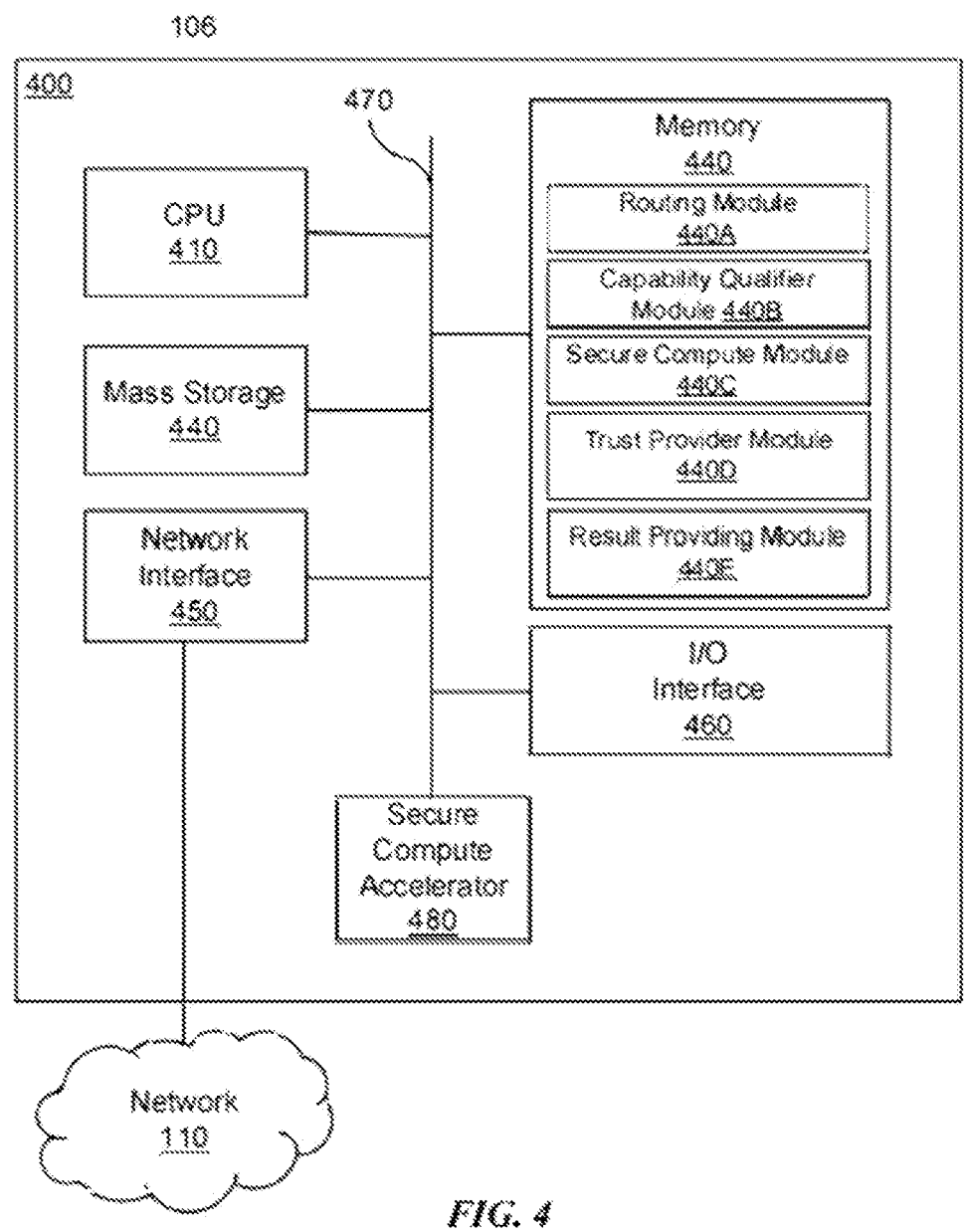
FIG. 4 illustrates a high level block diagram of a computing system that may be used in one embodiment of a network node.

FIG. 4 illustrates a high level block diagram of a computing system 400 that may be used in one embodiment of a network node 106. The computing system 400 has some elements in common with computing system 300, which will not be described in detail. For example, the computing system 400 has a CPU 410, memory 440 (a.k.a., mass storage), a network interface 450, I/O interface 460 connected to a bus 470.

The memory 440 stores various modules. The routing module 440A is configured to receive and process routing requests in a network, such as network 110. In one embodiment, the routing module 440A is configured to route packets in accordance with an Open System Interconnection (OSI) layer 3 protocol. In one embodiment, the routing module 440A is configured to deliver frames in accordance with an Open System Interconnection (OSI) layer 2 protocol.

The capability qualifier module 440B is configured to inform other nodes (typically not another network node 106) that the network device 106 is able to perform a particular type (or types) of secure compute. The type of secure compute may indicate a type of zero-knowledge proof, a type of MPC, or some other privacy preserving compute. The capability qualifier module 440B is configured to add information to a packet header that indicates that the network device 106 is able to perform a particular type of secure compute, in one embodiment. The packet header may be for one or more of the packets that are routed by the network device 106. The capability qualifier module 440B is configured to receive a query, via a network, whether the network device 106 is able to perform a particular type of secure compute, in one embodiment. The capability qualifier module 440B is configured to respond to the query to indicate that the network device is able to perform the particular type of secure compute, in one embodiment.

The secure compute module 440C is configured to perform a secure compute. As has been mentioned above, a secure compute (also known as privacy-preserving compute) is a subfield of cryptography with the goal of creating methods for computing a result over for some input(s) while keeping the input(s) private. In one embodiment, the secure compute includes a zero-knowledge proof (also referred to as a zero-knowledge protocol). In one embodiment, the secure compute includes a secure MPC.

The trust providing module 440D is configured to perform an operation that ensures that the result of the secure compute is the correct result (e.g., is a trusted result). In one embodiment, trust providing module 440D is configured to communicate with other network devices 106 that performed the same secure compute. This may allow, for example, the network device 106 to act as a peer with other network devices in the network that performed the secure compute. In one embodiment, the network device 106 is configured to act as a peer node in a blockchain network. By acting as a peer node in a blockchain network when performing the secure compute, the network device 106 helps to ensure that the result of the secure compute is trusted to be correct.

The result providing module 440E is configured to provide the result of the secure compute to a result device 104 connected to the network 110. In one embodiment, the result is sent from the network device 106 to the result device 104. In one embodiment, the network device 106 records the result in a blockchain ledger. The blockchain ledger is stored on the network device 106, in one embodiment. For example, the blockchain ledger could be stored in memory 440 (a.k.a., mass storage). The result device 104 obtains the result from the blockchain ledger, in one embodiment.

The secure compute may require substantial computation power, in some embodiments. The secure compute accelerator 480 is configured to accelerate the secure compute, in one embodiment. The secure compute accelerator 480 may contain hardware (e.g., a processor and possibly additional memory). The secure compute accelerator 480 comprises a hardware accelerator, in one embodiment. The hardware accelerator is configured to perform a secure compute, in one embodiment. Thus, the secure compute accelerator 480 is specifically designed to perform the secure compute, in one embodiment. Hence, the secure compute accelerator 480 is able to perform the secure compute faster than a general purpose processor, in one embodiment. The secure compute accelerator 480 is not required. Hence, in one embodiment, the secure compute is performed on the CPU 410.

Figure 5:
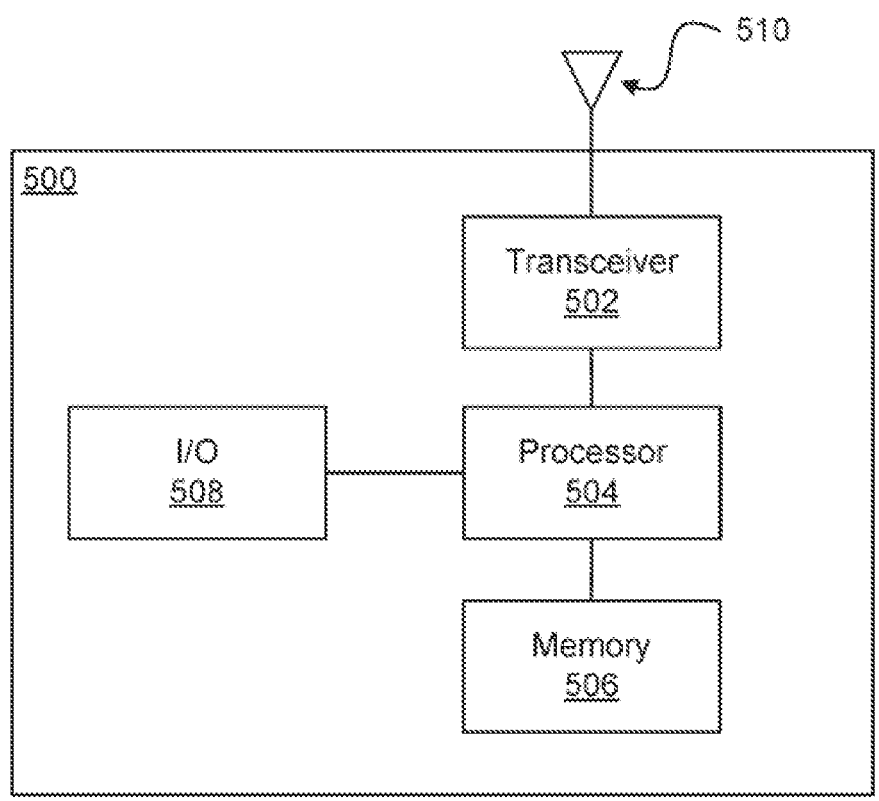
FIG. 5 illustrates an example user equipment.

FIG. 5 illustrates example user equipment. The user equipment 500 may be used to implement an input node 102 or a result node 104. The user equipment (UE) may for example be a mobile telephone, but may be other devices in further examples such as a desktop computer, laptop computer, tablet, hand-held computing device, automobile computing device and/or other computing devices. As shown in the figure, the UE 500 includes at least one processor 504. The processor 504 implements various processing operations of the UE 500. For example, the processor 504 may perform signal coding, data processing, power control, input/output processing, or any other functionality enabling the UE 500 to operate in the system 100 (FIG. 1). The processor 504 may include any suitable processing or computing device configured to perform one or more operations. For example, the processor 504 may include a microprocessor, microcontroller, digital signal processor, field programmable gate array, or application specific integrated circuit.

The UE 500 also includes at least one transceiver 502. The transceiver 502 is configured to modulate data or other content for transmission by at least one antenna 510. The transceiver 502 is also configured to demodulate data or other content received by the at least one antenna 510. Each transceiver 502 may include any suitable structure for generating signals for wireless transmission and/or processing signals received wirelessly. Each antenna 510 includes any suitable structure for transmitting and/or receiving wireless signals. It is appreciated that one or multiple transceivers 502 could be used in the UE 500, and one or multiple antennas 510 could be used in the UE 500. Although shown as a single functional unit, a transceiver 502 may also be implemented using at least one transmitter and at least one separate receiver.

The UE 500 further includes one or more input/output devices 508. The input/output devices 508 facilitate interaction with a user. Each input/output device 508 includes any suitable structure for providing information to or receiving information from a user, such as a speaker, microphone, keypad, keyboard, display, or touch screen.

In addition, the UE 500 includes at least one memory 506. The memory 506 stores instructions and data used, generated, or collected by the UE 500. For example, the memory 506 could store software or firmware instructions executed by the processor(s) 504 and data used to reduce or eliminate interference in incoming signals. Each memory 506 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Figure 6:
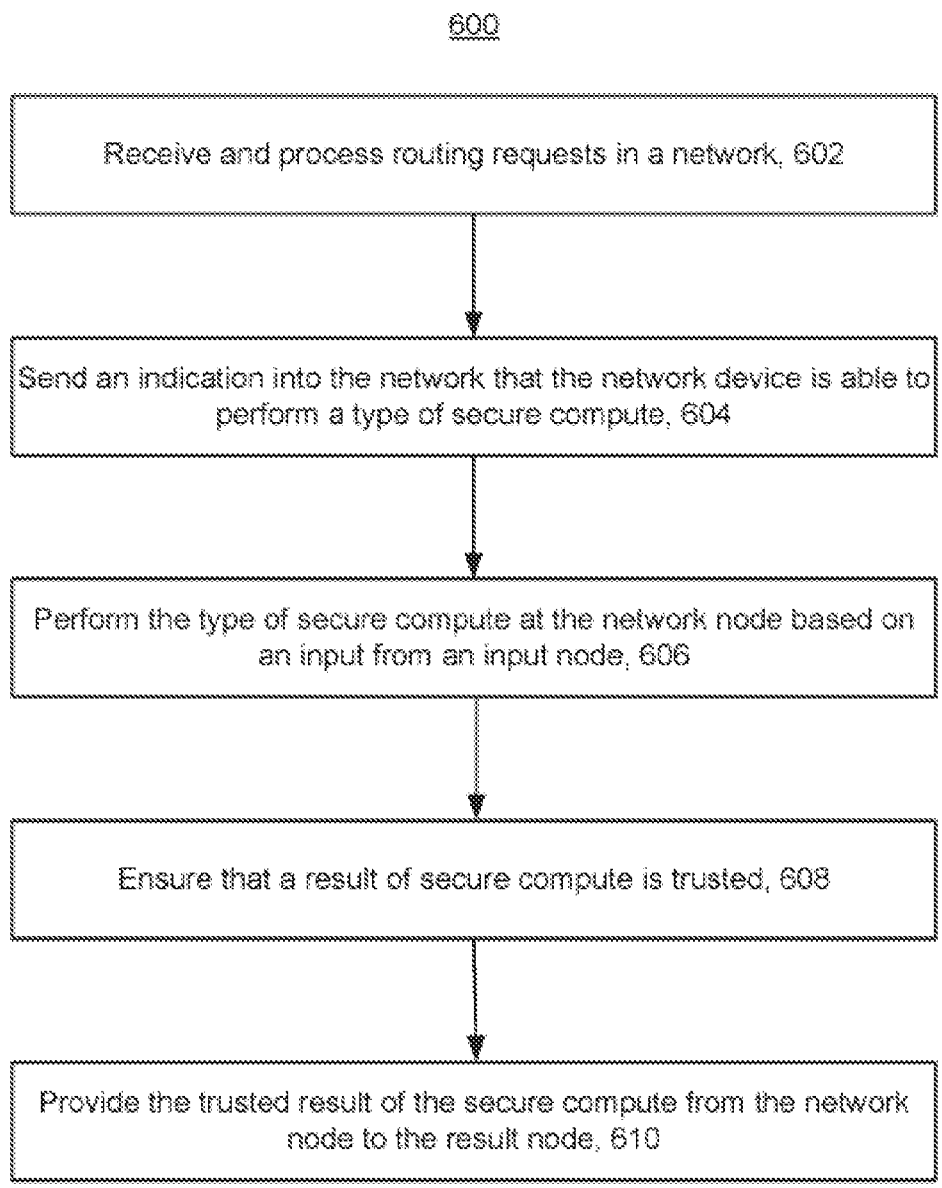
FIG. 6 is a flowchart of one embodiment of a process of secure computing performed by a network node.

FIG. 6 is a flowchart of one embodiment of a process 600 of secure computing. The process 600 is performed by a network node 106, in one embodiment. Step 602 includes receiving and processing routing requests in a network 110. Step 602 includes routing packets in accordance with an Open System Interconnection (OSI) layer 3 protocol, in one embodiment. Step 602 includes delivering frames in accordance with an Open System Interconnection (OSI) layer 2 protocol, in one embodiment. Step 602 includes receiving and processing routing requests in accordance with an MPLS protocol, in one embodiment.

Step 604 includes sending an indication into the network 110 that the network device 106 is able to perform a type of secure compute. In one embodiment, step 604 includes the network device 106 adding information to a header of a packet that indicates that the network device 106 is able to perform the type of secure compute. For example, as packets are being processed in step 602, the network device 106 may add information to a header of one or more of the packets. The packet may be a packet that is delivered between the input node 102 and the result node 104; however, this is not required. Thus, the network device 106 is one of the network devices 106 that processes a packet transmitted between the input node 102 and result node 104, in one embodiment.

Other techniques may be used for the network node 106 to indicate that it is capable of performing the type of secure compute. In one embodiment, the network device 106 responds to a query from, for example, the input node 102 or the result node 104 about the capabilities of the network node 106. For example, the network device 106 may receive a query of whether the network device 106 is able to perform a type of secure compute. This request is received from a node that will be providing input to the secure compute (or an input node 102), in one embodiment. This request is received from a node that will be receiving the result of the secure compute (or a result node 104), in one embodiment.

Step 606 includes a network node 106 performing the type of secure compute based on an input from the input node(s) 102. The network node 106 may receive an input to the secure compute from each of one or more input nodes 102 prior to step 606, in one embodiment. In one embodiment, the network node 106 performs the secure compute based on an input from a single input node 102. In one embodiment, the network node 106 performs the secure compute based on a separate input from each of two or more input nodes 102. In one embodiment, the network node 106 is one of two or more network nodes 106 that perform the same secure compute. In one embodiment, the secure compute includes a zero-knowledge proof. In this case, the input node 102 might provide a proof and a verification to the network node 106. The network node 106 may verify the correctness of the zero-knowledge proof, based on the verification key.

Step 608 includes the network node 106 ensuring that the result of the secure compute is trusted to be correct. There are numerous ways that the network node 106 may ensure that the result is trusted to be correct. In one embodiment, the network node 106 acts as a peer with other network devices in the network 110 that performed the secure compute to ensure that the result is trusted to be correct. The network node 106 acts as a peer in a blockchain network to ensure that the result is trusted to be correct, in one embodiment. The network node 106 notarizes results of the secure compute from a set of network devices, in one embodiment. The network node 106 performs the secure compute in a TEE to ensure that the result is trusted to be correct, in one embodiment.

Step 610 includes the network node 106 providing a result of the secure compute to the result node 104. Step 610 includes providing the result either directly from the network node 106 to the result node 104 or indirectly from the network node 106 to the result node 104. In one embodiment, the network node 106 provides the result directly to the result node 104. In one embodiment, the network node 106 provides the result directly to a notary node, which provides the final result to the result node 104. In one embodiment, the network node 106 adds the result to a blockchain ledger in order to indirectly provide the result to the result node 104. That is, the result node 104 obtains the result from the blockchain ledger in order to indirectly obtain the result from the network node 106.

Figure 7:
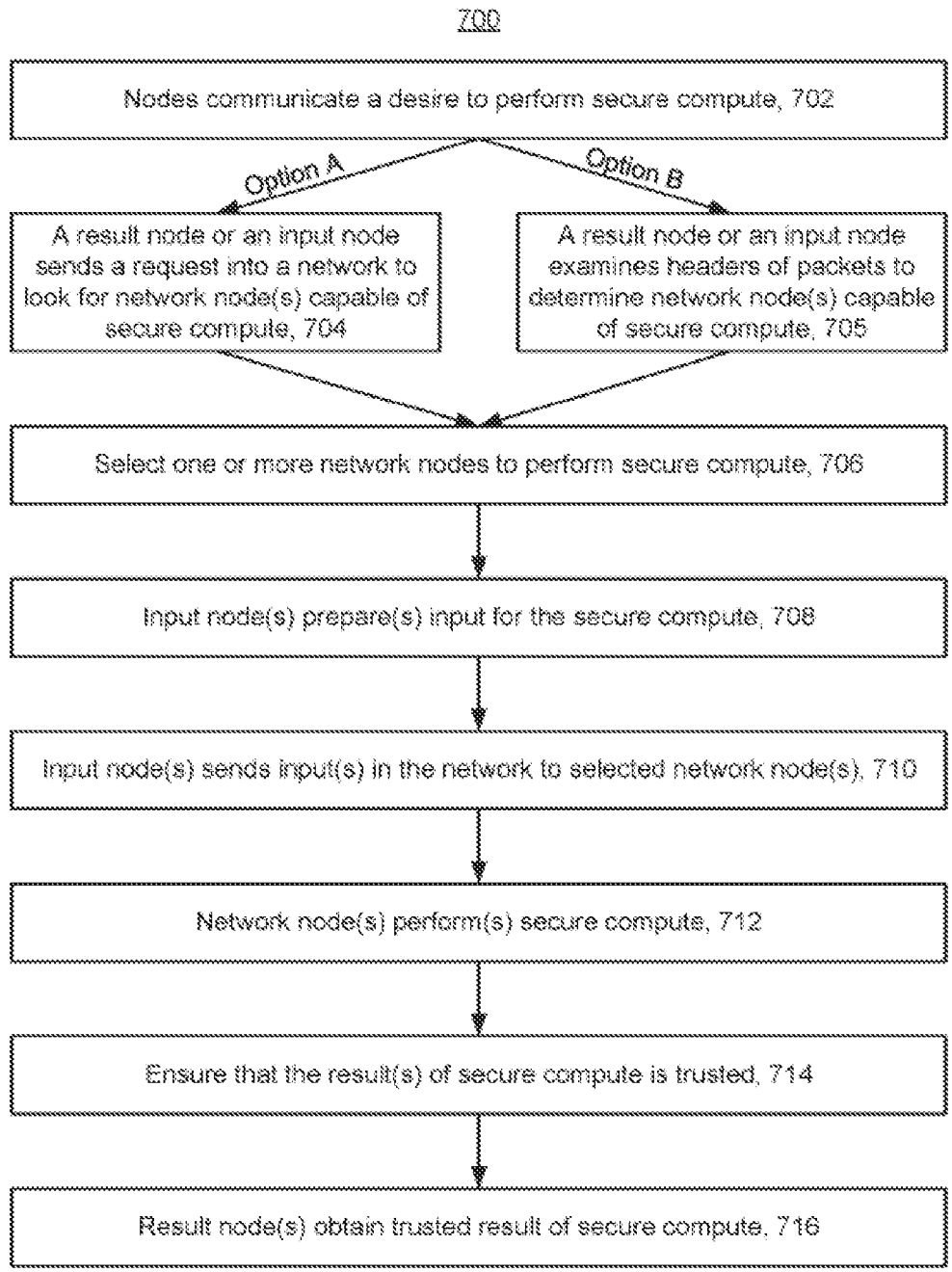
FIG. 7 is a flowchart of one embodiment of a process of secure computing.

FIG. 7 is a flowchart of one embodiment of a process 700 of secure computing. The process 700 may be performed in communication system 100, but is not limited thereto. In process 700, there may be one or more input nodes 102, one or more result nodes 104, and one or more network nodes 106 may perform the secure compute.

Step 702 includes nodes communicating a desire to perform a secure compute. In one embodiment, a result node 104 sends a request to an input node 102 to perform a zero-knowledge proof. This request passes through the network 110, and may be processed by one or more network nodes 106 that are capable of performing secure computes. However, it is possible that none of the network nodes 106 that process the request are capable of performing secure computes.

Steps 704 and 705 describe different options for learning which one or more network nodes 106 are capable of performing secure computes. Either or both steps may be performed.

Step 704 (Option A) includes either a result node 104 or an input node 102 sending one or more requests into the network 110 to look for a network node 106 that is capable of performing secure computes. In one embodiment, the one or more requests are sent to network nodes 106 that processed the request of step 702. However, the request(s) may be sent to network nodes 106 that did not process the request of step 702. One or more network nodes 106 may respond to the request of step 704, indicating that the respective network node 106 is capable of performing secure computes.

Step 705 (Option B) includes either a result node 104 or an input node 102 examining a header of one or more received packets to determine which network node (or nodes) 106 is/are capable of performing secure computes. In one embodiment, the one or more received packets are associated with the communication between the nodes in step 702. For example, a result node 104 or an input node 102 may examine the header of a packet it received from the other node in step 702. However, the one or more packets are not required to be associated with the communication between the nodes in step 702.

Step 706 includes selecting one or more network nodes 106 that is/are capable of performing the secure compute. This selection is based on the network nodes 106 that respond to the request of step 704, in one embodiment. This selection is based on examining the headers of packets in step 705, in one embodiment. In one embodiment, a single network node 106 is selected. In one embodiment, multiple network nodes 106 are selected. The selection is made by a result node 104, in one embodiment. The selection is made by an input node 102, in one embodiment.

The selection in step 706 is based on the distance to the network node 106 from the input node 102, in one embodiment. The selection in step 706 is based on the distance to the network node 106 from the result node 104, in one embodiment. For example, in either case a network node 106 having the shortest distance may be selected. The selection in step 706 is based on the route between the input node 102 and the result node 104. For example, the network node 106 can be selected to achieve the shortest route between the input node 102 and the result node 104.

The selection in step 706 is based on capabilities of the network node 106, in one embodiment. For example, there may be different algorithms for performing the secure compute. The selection could be made based on which algorithm(s) a network node 106 is able to perform. The selection in step 706 could be based on more than one factor. For example, the selection could be based on both distance (e.g., distance to the network node 106, routing distance between input node 102 and result node 104, etc.) and capability (e.g., secure compute algorithms which network node 106 is able to perform). In one embodiment, the network node 106 is selected based on a matrix of factors.

Step 708 includes one or more input nodes 102 preparing the input for the secure compute. Step 708 includes each input node 102 encrypting the information that is desired to be kept private, in one embodiment. In one embodiment, an input node 102 prepares a zero-knowledge proof. Further details of an input node 102 preparing a zero-knowledge proof are discussed in connection with process 1200 in FIG. 12 (see, for example, step 1208). The input in step 708 is not limited to being a zero-knowledge proof. Step 708 may include each node of an MPC preparing their respective inputs. For example, process 700 might be used to allow several parties to place a bid without revealing the actual bid by, for example, encrypting the bids.

Step 710 includes the one or more input nodes 102 sending their respective input to each of the one or more selected network nodes 106.

Step 712 includes each of the one or more selected network nodes 106 performing the secure compute. In one embodiment, each network node 106 verifies the zero-knowledge proof. In one embodiment, each network node 106 performs an MPC.

Step 714 includes ensuring that that the results of the secure compute is trusted to be correct. In one embodiment, the trust is ensured by a security mechanism on the network node 106. For example, the network node 106 may perform the secure compute in a TEE. In one embodiment, the trust is ensured by multiple network nodes 106 sending the result of the secure compute to a notary node, which notarizes the result. By "notarizing the result," it is meant that the notary compares the results from the multiple network nodes 106 to verify that the result can be trusted to be correct. In one embodiment, the result can be trusted if all of the results are the same. In one embodiment, the trust is ensured by multiple network nodes 106 acting as peers in a blockchain network, and recording the result into the blockchain ledger.

Step 716 includes one or more result nodes 104 obtaining the result. In one embodiment, a result node 104 obtains the result directly from a network node 106 that performed the secure compute. In one embodiment, a result node 104 obtains the result indirectly from a notary node that notarized the result. In one embodiment, a result node 104 obtains the result from a blockchain ledger, into which the result has been recorded.

Figure 8:
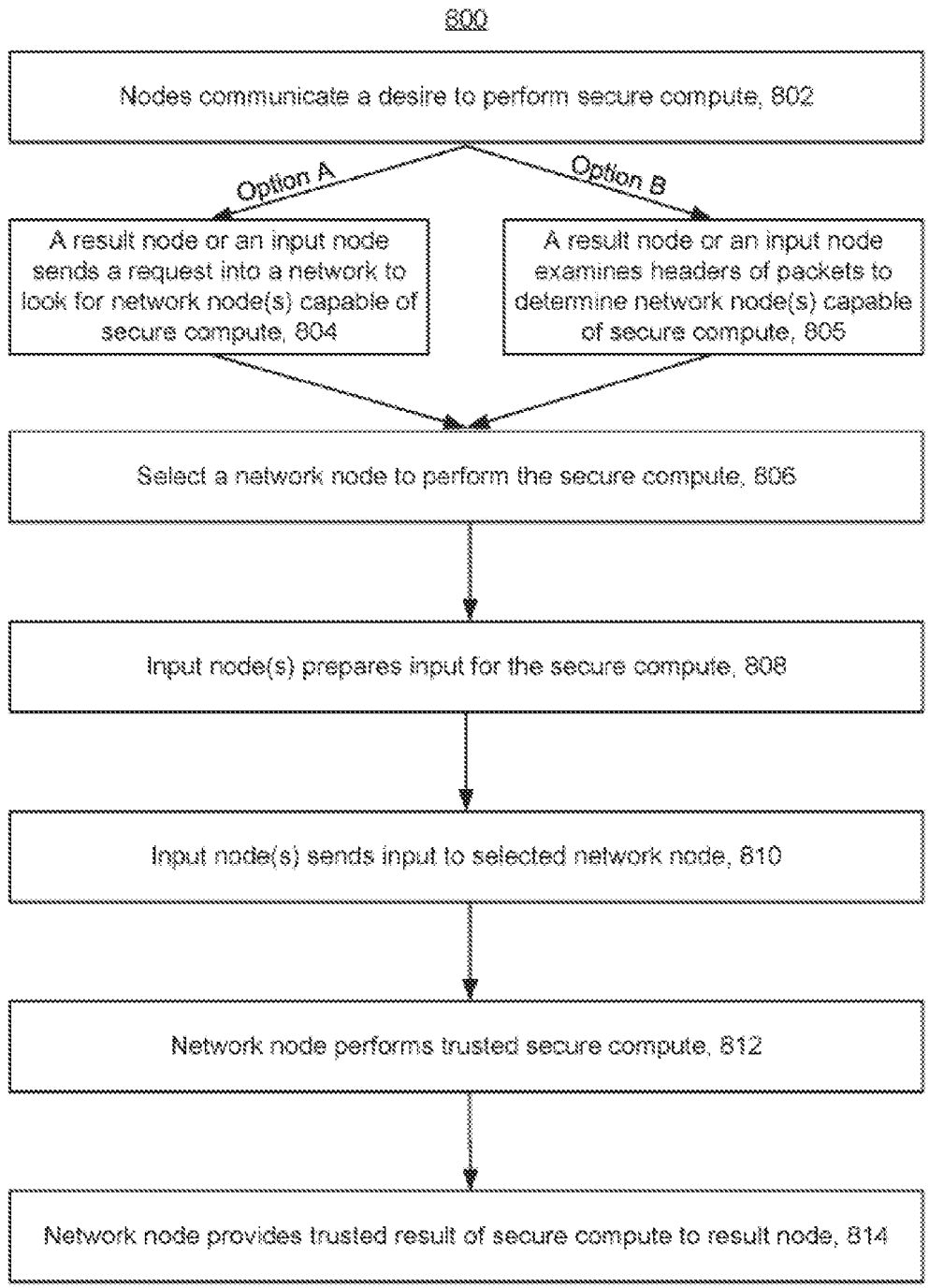
FIG. 8 illustrates an embodiment of a process in which a single network node performs a secure compute.
Figure 9:
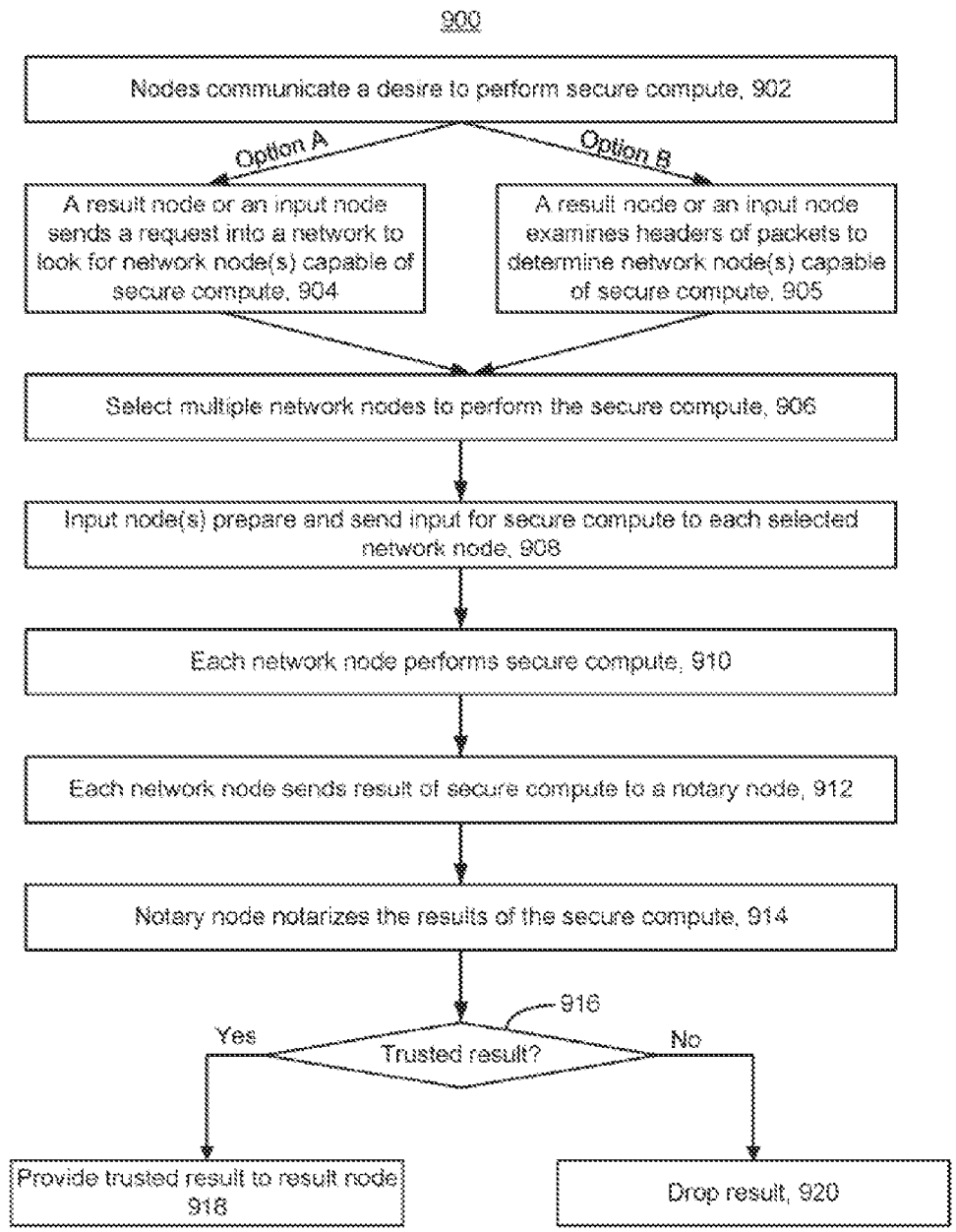
FIG. 9 illustrates an embodiment of a process in which multiple network nodes perform a secure compute.
Figure 10:
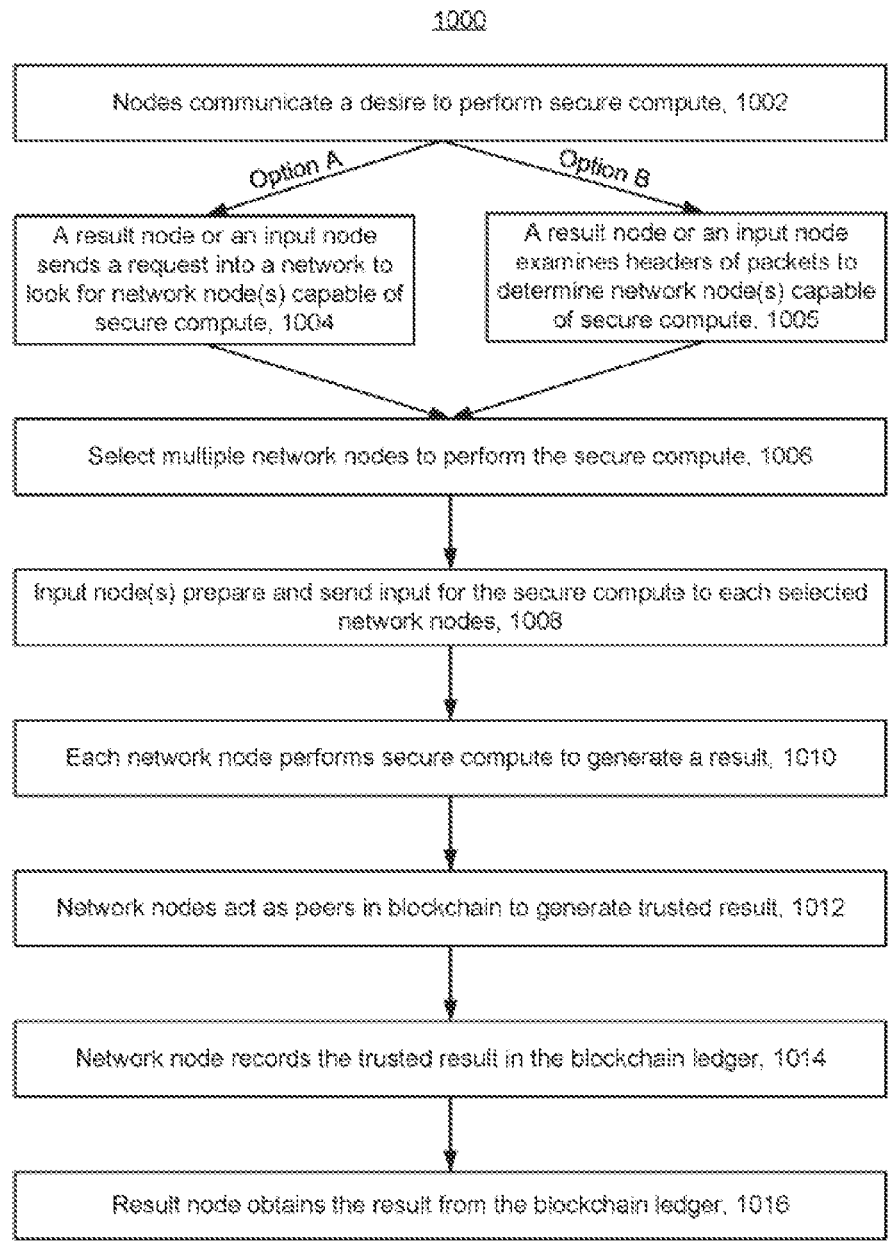
FIG. 10 illustrates an embodiment of a process in which the result of a secure compute is recorded in a blockchain ledger.

FIGS. 8, 9, and 10 describe three different embodiments of secure compute. These are three different embodiments of process 700. FIG. 8 describes an embodiment in which a single network node 106 performs the secure compute. FIG. 9 describes an embodiment in which multiple network nodes 106 perform the secure compute. FIG. 10 describes an embodiment in which the result of the secure compute is recorded in a blockchain ledger.

Referring now to FIG. 8, a flowchart of one embodiment of a process 800 of secure computing using a single network node 106 is depicted. The process 800 may be performed in communication system 100, but is not limited thereto. In process 800, there may be one or more input nodes 102, and one or more result nodes 104.

Step 802 includes nodes communicating a desire to perform a secure compute. In one embodiment, a result node 104 sends a request to an input node 102 to perform a zero-knowledge proof.

Step 804 (Option A) includes either a result node 104 or an input node 102 sending one or more requests into the network 110 to look for a network node 106 that is capable of performing secure computes. In one embodiment, the one or more requests are sent to network nodes 106 that processed the request of step 802. However, the request(s) may be sent to network nodes 106 that did not process the request of step 802. One or more network nodes 106 may respond to the request of step 804, indicating that the respective network node 106 is capable of performing secure computes.

Step 805 (Option B) includes either a result node 104 or an input node 102 examining a header of one or more received packets to determine which network node (or nodes) 106 is/are capable of performing secure computes. In one embodiment, the one or more received packets are associated with the communication between the nodes in step 802. However, the one or more packets are not required to be associated with the communication between the nodes in step 802.

Step 806 includes selecting a network node 106 to perform the secure compute. This selection is based on the network nodes 106 that respond to the request of step 804, in one embodiment. This selection is based on examining the headers of packets in step 805, in one embodiment. For example, a result node 104 or an input node 102 may examine the header of a packet it received from the other node in step 802.

Step 808 includes one or more input nodes 102 preparing the input to the secure compute. In one embodiment, an input node 102 prepares a zero-knowledge proof. Step 808 may include each node of an MPC preparing their respective inputs.

Step 810 includes the one or more input node 102 sending their respective input to the selected network node 106. Step 812 includes the selected network node 106 performing the secure compute. In one embodiment, the network node 106 performs the secure compute in a TEE, which is one embodiment of step 714 (ensuring that the result is trusted). Other trust mechanisms can be used at the network node 106 to ensure that the result is trusted.

Step 814 includes the selected network node 106 providing the result to the result node 104. In one embodiment, the selected network node 106 sends the result directly to the result node 104.

Referring now to FIG. 9, a flowchart of one embodiment of a process 900 of secure computing using multiple network nodes 106 is depicted. The process 900 may be performed in communication system 100, but is not limited thereto. In process 900, there may be one or more input nodes 102, and one or more result nodes 104.

Step 902 includes nodes communicating a desire to perform a secure compute. In one embodiment, a result node 104 sends a request to an input node 102 to perform a zero-knowledge proof.

Step 904 (Option A) includes either a result node 104 or an input node 102 sending one or more requests into the network 110 to look for a network node 106 that is capable of performing secure computes. In one embodiment, the one or more requests are sent to network nodes 106 that processed the request of step 902. However, the request(s) may be sent to network nodes 106 that did not process the request of step 902. One or more network nodes 106 may respond to the request of step 904, indicating that the respective network node 106 is capable of performing secure computes.

Step 905 (Option B) includes either a result node 104 or an input node 102 examining a header of one or more received packets to determine which network node (or nodes) 106 is/are capable of performing secure computes. In one embodiment, the one or more received packets are associated with the communication between the nodes in step 802. For example, a result node 104 or an input node 102 may examine the header of a packet it received from the other node in step 902. However, the one or more packets are not required to be associated with the communication between the nodes in step 902.

Step 906 includes selecting multiple network nodes 106 that are capable of performing the secure compute. In the event that only one network node 106 responds that it is capable of performing the secure compute, process 800 could be performed.

Step 908 includes one or more input nodes 102 preparing the input. In one embodiment, an input node 102 prepares a zero-knowledge proof. Step 808 may include each node of an MPC preparing their respective inputs. Step 908 also includes the one or more input node 102 sending their respective input to each of the selected network nodes 106. Step 910 includes each of the selected network nodes 106 performing the secure compute. Step 912 includes the selected network nodes 106 providing their respective results to a notary node. The notary node could be the result node, but that is not required.

Step 914 includes the notary node notarizing the results. In one embodiment, the result from each of the network nodes 106 should match for the result to be valid. If the result is valid (step 916), then the notary node sends the valid result to the one of more result nodes 104, in step 918. If the result is not valid, then the notary node drops the result (step 920). Note that the notary node can optionally be a result node. Steps 914-920 are one embodiment of step 714 (ensuring that the result is trusted).

In one embodiment, the notary node performs a "majority rules" algorithm in which the notary node selects as the final result what result is most prevalent. For example, if each network node provides a TRUE or FALSE result, the notary node determines whether there are more TRUE or FALSE results. In one embodiment, an odd number of network nodes are used to prevent ties. In another embodiment, an even number of network nodes are permitted, with the results being discarded in the event of a tie.

Referring now to FIG. 10, a flowchart of one embodiment of a process 1000 of secure computing using multiple network nodes 106 and a blockchain is depicted. The process 1000 may be performed in communication system 100, but is not limited thereto. In process 1000, there may be one or more input nodes 102, and one or more result nodes 104.

Step 1002 includes nodes communicating a desire to perform a secure compute. In one embodiment, a result node 104 sends a request to an input node 102 to perform a zero-knowledge proof.

Step 1004 (Option A) includes either a result node 104 or an input node 102 sending one or more requests into the network 110 to look for a network node 106 that is capable of performing secure computes. In one embodiment, the one or more requests are sent to network nodes 106 that processed the request of step 1002. However, the request(s) may be sent to network nodes 106 that did not process the request of step 1002. One or more network nodes 106 may respond to the request of step 1004, indicating that the respective network node 106 is capable of performing secure computes.

Step 1005 (Option B) includes either a result node 104 or an input node 102 examining a header of one or more received packets to determine which network node (or nodes) 106 is/are capable of performing secure computes. In one embodiment, the one or more received packets are associated with the communication between the nodes in step 802. For example, a result node 104 or an input node 102 may examine the header of a packet it received from the other node in step 1002. However, the one or more packets are not required to be associated with the communication between the nodes in step 1002.

Step 1006 includes selecting multiple network nodes 106 that are capable of performing the secure compute. In the event that only one network node 106 responds that it is capable of performing the secure compute, process 800 could be performed.

Step 1008 includes one or more input nodes 102 preparing the input. In one embodiment, an input node 102 prepares a zero-knowledge proof. Step 1008 may include each node of an MPC preparing their respective inputs. Step 1008 also includes the one or more input node 102 sending their respective input to each of the selected network nodes 106. Step 1010 includes each of the selected network nodes 106 performing the secure compute.

Step 1012 includes the selected network nodes 106 acting as peers in a blockchain network to verify result. Step 1014 includes at least one of the selected network nodes 106 recording the verified result in a blockchain ledger. The blockchain ledger may be stored on one or more of the peers. In one embodiment, all of the blockchain peers store a copy of the blockchain ledger. Steps 1012 and 1014 are one embodiment of step 714 (ensuring that the result is trusted).

Step 1016 includes the result node(s) 104 obtaining the result from the blockchain ledger.

Figure 11:
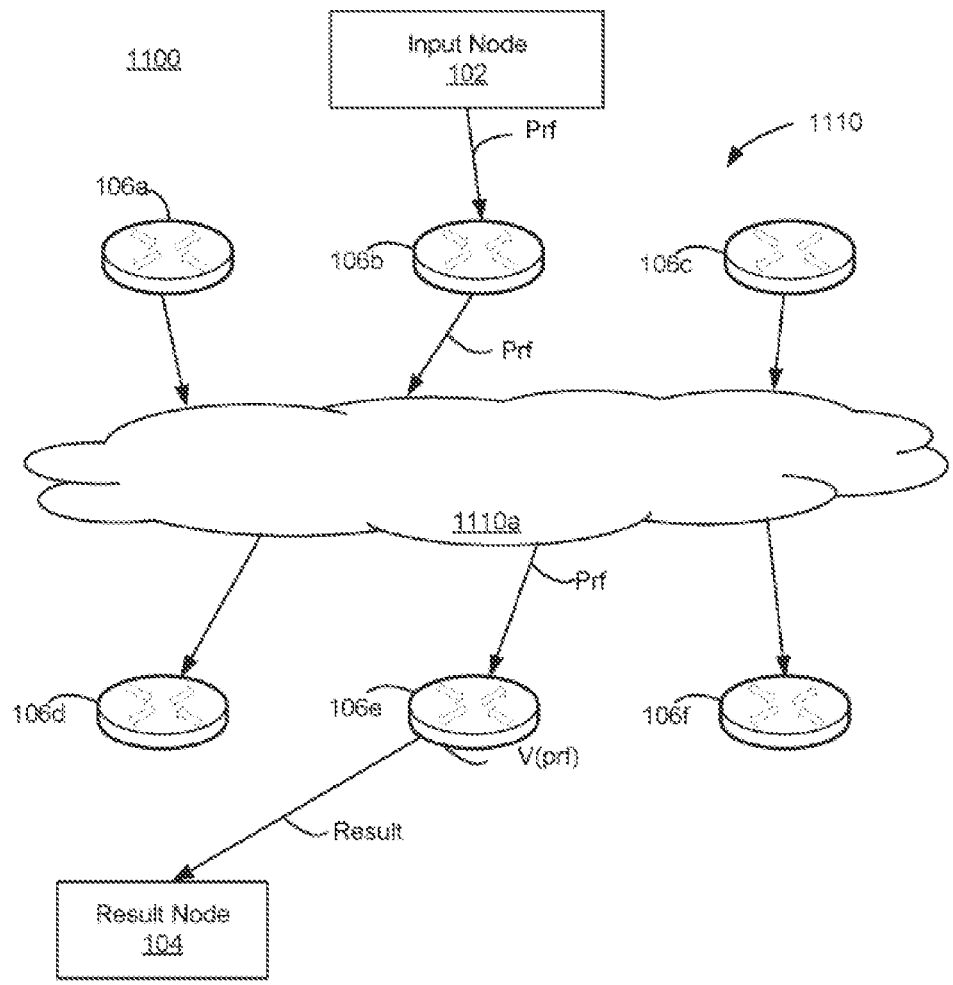
FIG. 11 depicts an embodiment of a communication system in which a single network node verifies a zero-knowledge proof.
Figure 12:
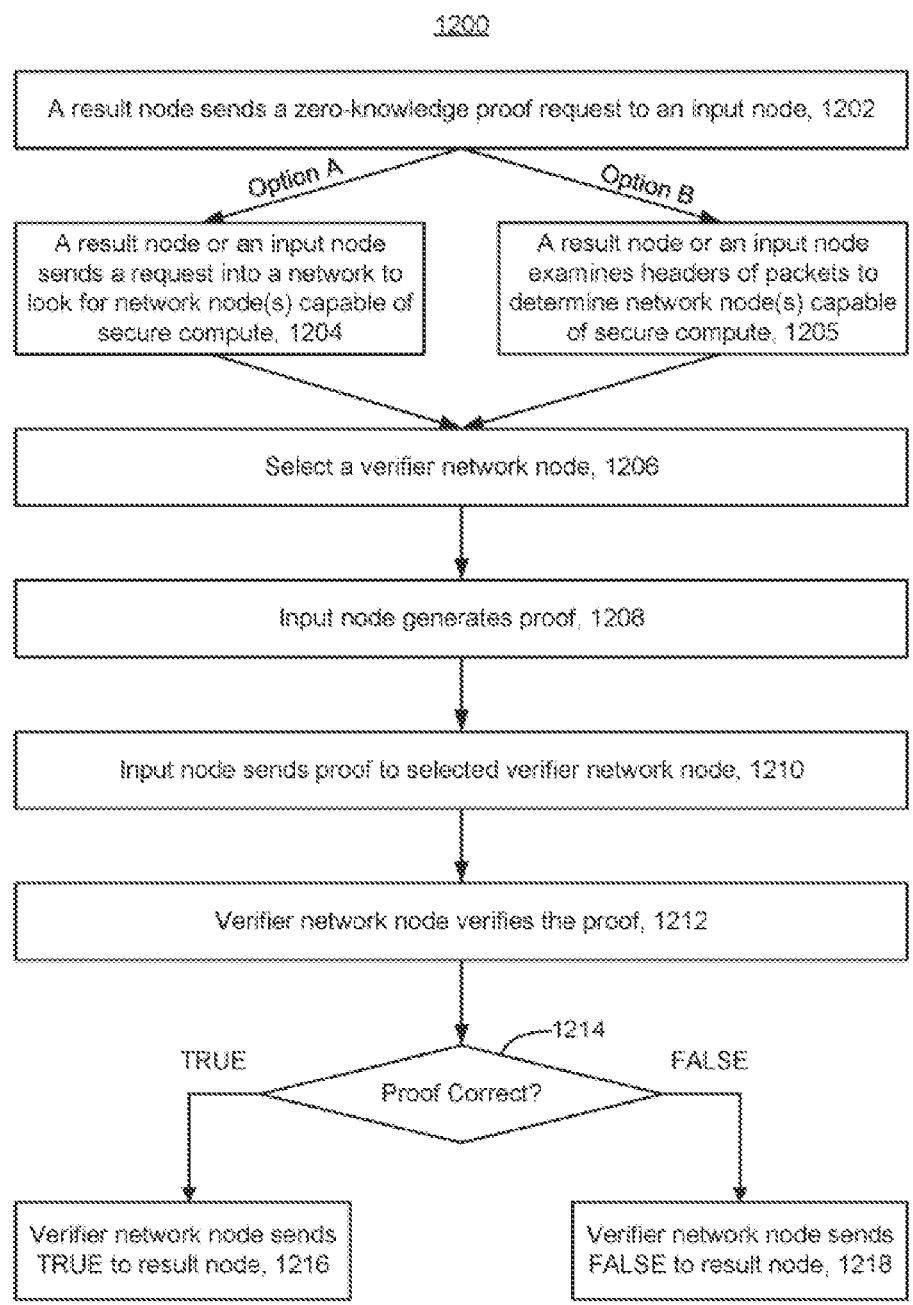
FIG. 12 describes a flowchart of one embodiment of a process that may be used in communication system 1100 of FIG. 11.
Figure 13:
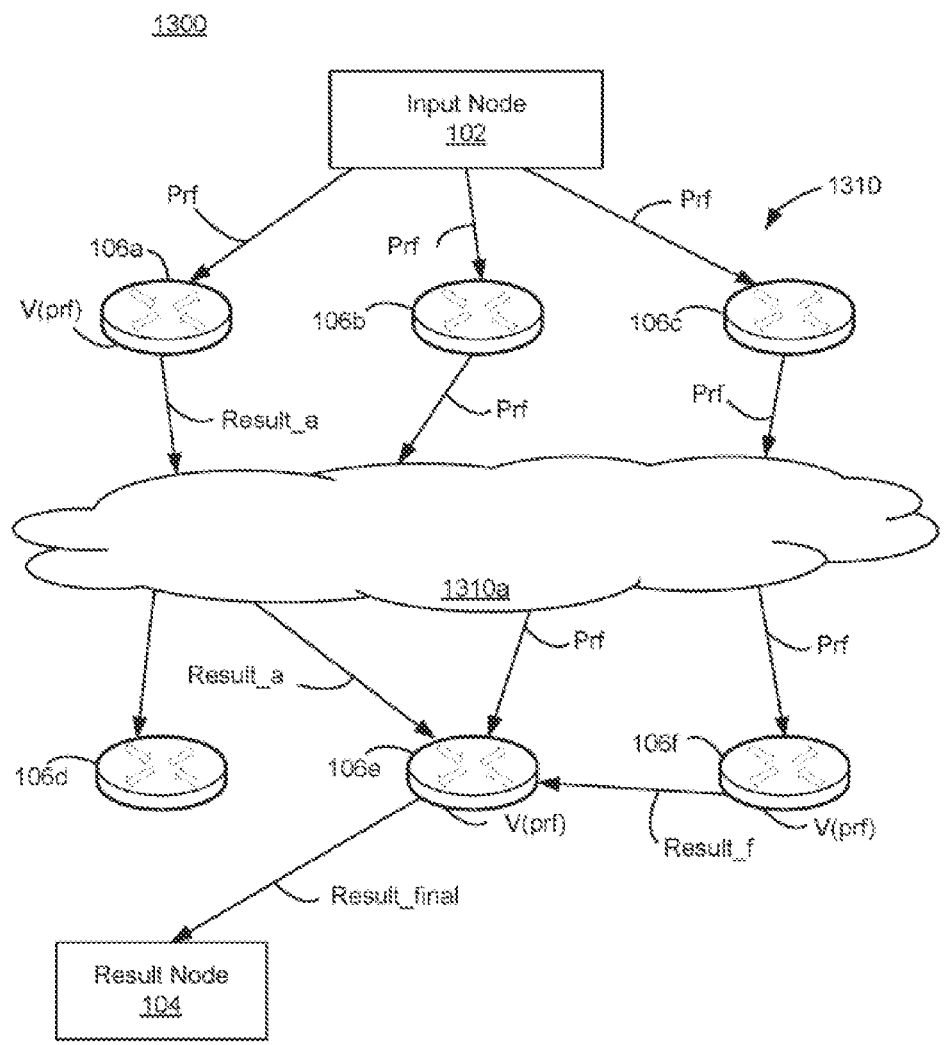
FIG. 13 depicts an embodiment of a communication system in which multiple network nodes verify a zero-knowledge proof, and in which there is a notary node to notarize the results.
Figure 14:
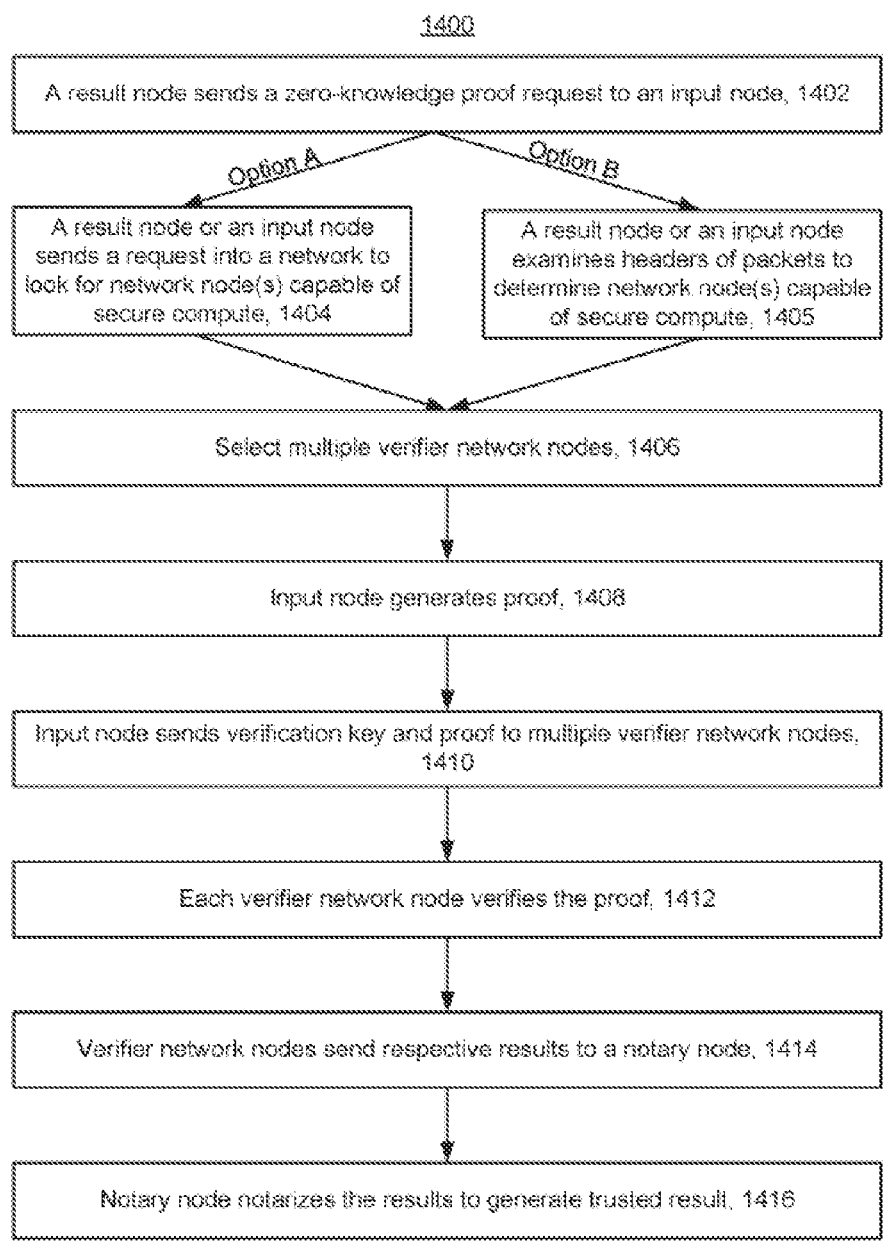
FIG. 14 depicts a flowchart of one embodiment of a process that may be used in communication system 1300 of FIG. 13.
Figure 15:
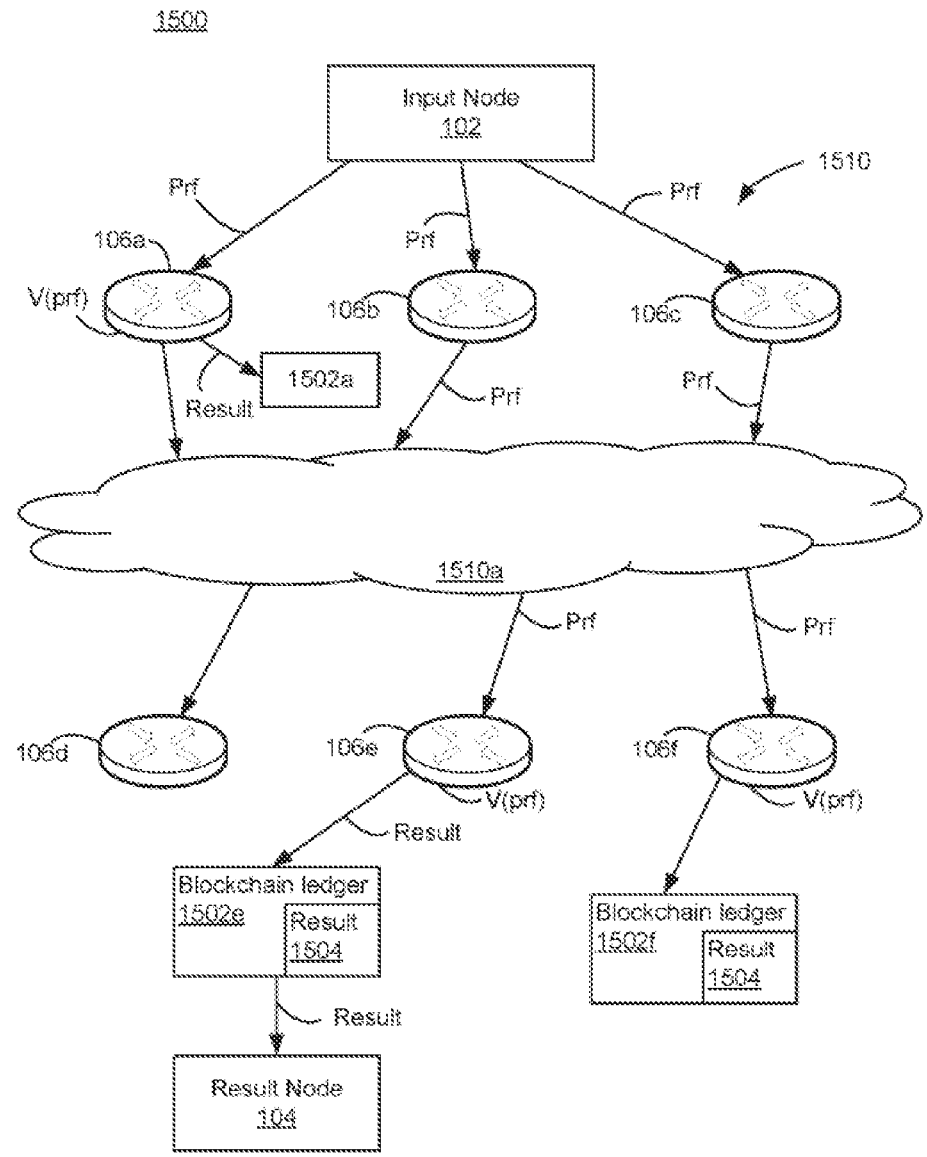
FIG. 15 depicts an embodiment of a communication system in which multiple network nodes, which act as peers in a blockchain network, verify a zero-knowledge proof FIG. 16 describes a flowchart of one embodiment of a process that may be used in communication system 1500 of FIG. 15.
Figure 16:
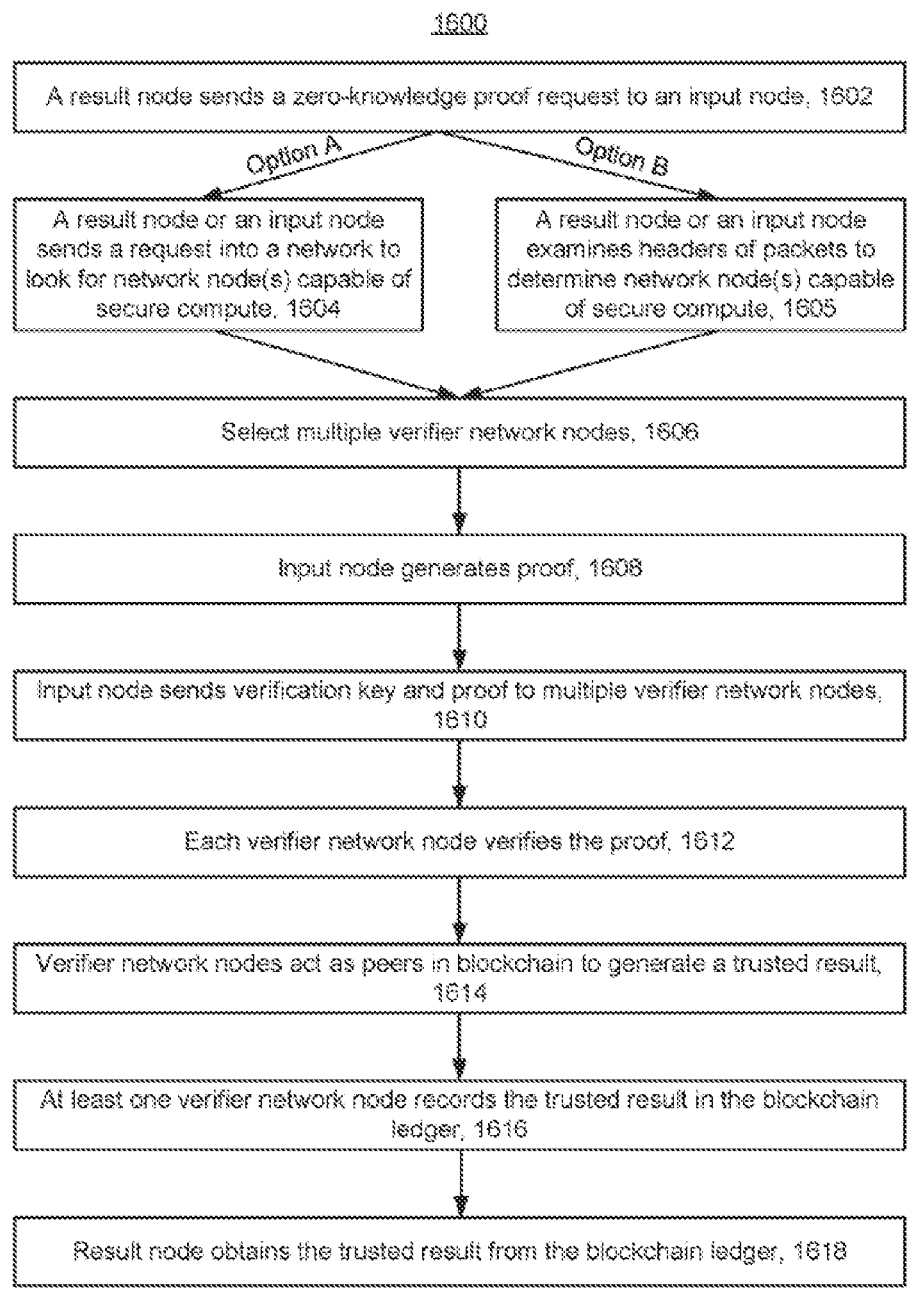

In some embodiments, the secure compute that is performed by a network node 106 is a zero-knowledge proof. The zero-knowledge proof is a non-interactive zero-knowledge proof, in one embodiment. FIGS. 11-16 show details of embodiments in which the secure compute that is performed by a network node 106 is a zero-knowledge proof. FIG. 11 depicts an embodiment of a communication system 1100 in which a single network node 106 verifies a zero-knowledge proof. FIG. 12 describes a flowchart of one embodiment of a process 1200 that may be used in communication system 1100. FIG. 13 depicts an embodiment of a communication system 1300 in which multiple network nodes 106 verify a zero-knowledge proof, and in which there is a notary node to notarize the results. FIG. 14 depicts a flowchart of one embodiment of a process 1400 that may be used in communication system 1300. FIG. 15 depicts an embodiment of a communication system 1500 in which multiple network nodes 106, which act as peers in a blockchain network, verify a zero-knowledge proof. FIG. 16 describes a flowchart of one embodiment of a process 1600 that may be used in communication system 1500.

Referring now to FIG. 11, a communication system 1100 in which embodiments may be practiced is depicted. The communication system 1100 includes an input node 102, a result node 104, and several network nodes 106 in a network 1110. Six network nodes 106a-106f are explicitly depicted. There may be other network nodes 106 in a portion of the network 1110a, which are not depicted. The depicted network nodes 106a-106f are considered to reside in one or more networks. In communication system 1100, network node 106e has been selected to verify a zero-knowledge proof. In general, input node 102 performs a zero-knowledge proof (Prf), and sends the proof to the verifier network node 106e. The verifier network node 106e verifies the proof, and sends a result of the proof to a result node 104.

The zero-knowledge proof comprises a mathematical algorithm ("P" or "proof algorithm"), in one embodiment. The proof algorithm inputs a proving key ("pk"), a random input ("x"), and a private statement ("w"), in one embodiment. The private statement is what the prover (e.g., person operating the input node 102) wishes to keep private. The proving key and the random input are publicly available information, in one embodiment. The proof serves to encrypt the private statement ("w"), in one embodiment.

The verifier network node 106e performs a verification of the proof. To do so, the verifier network node 106e executes a mathematical algorithm ("V" or "verification algorithm"), in one embodiment. The verification algorithm (V) inputs the random input ("x"), a verifying key ("vk") and the proof (prf), in one embodiment. The verifying key is publicly available, in one embodiment. The verification algorithm (V) outputs a binary value (e.g., TRUE, FALSE), in one embodiment. The verifier network node 106e sends the result (e.g., TRUE, FALSE) to the result node 104.

In one embodiment, the zero-knowledge proof is based on zero-knowledge succinct non-interactive augments of knowledge (zk-SNARKs). zk-SNARKs are a type of non-interactive zero-knowledge proof. By non-interactive it is meant that the proof itself can used by the verifier without any further interaction from the prover. A zk-SNARK protocol may be based on three algorithms (G, P, V). The generator (G) algorithm may be used to generate the proving key (pk) and the verifying key (pv). The input to the generator (G) algorithm is a parameter lambda and a program. The parameter lambda is kept secret. The proving key (pk) and the verifying key (vk) may each be distributed publicly. In one embodiment, the network node 106e serves as the generator node to generate the proving key (pk) and the verifying key (pv). However, the generator node could be some other node. The generator node is not required to be a network node 106. The zk-SNARK protocol is one example of a protocol for zero-knowledge proofs. Other protocols for zero-knowledge proofs may be used. In one embodiment, the network node 106 advertises (see, for example, step 604 of FIG. 6) the type(s) of protocol that the network node 106 is capable of performing for a zero-knowledge proof Referring now to FIG. 12, a flowchart of one embodiment of a process 1200 of verifying a zero-knowledge proof is depicted. The process 1200 may be used in communication system 1100. Step 1202 includes a result node 104 sending a zero-knowledge proof request to an input node 102. This request refers to a request for the input node 102 to perform the zero-knowledge proof. This request could be initiated in response to a user of the input node 102 wanting to proof some piece of information to an entity controlling the result node 104, without the user revealing the piece of information.

Step 1204 (Option A) includes either a result node 104 or an input node 102 sending one or more requests into the network 110 to look for a network node 106 that is capable of performing secure computes. In one embodiment, the one or more requests are sent to network nodes 106 that processed the request of step 1202. However, the request(s) may be sent to network nodes 106 that did not process the request of step 1202. One or more network nodes 106 may respond to the request of step 1204, indicating that the respective network node 106 is capable of performing secure computes.

Step 1205 (Option B) includes either a result node 104 or an input node 102 examining a header of one or more received packets to determine which network node (or nodes) 106 is/are capable of performing secure computes. In one embodiment, the one or more received packets are associated with the communication between the nodes in step 1202. However, the one or more packets are not required to be associated with the communication between the nodes in step 1202.

Step 1206 includes selecting a verifier network node 106. The selection may be based on the location of network nodes 106. For example, a network node 106 that is close to the input node 102 and/or the result node 104 may be selected.

Step 1208 includes the input node 102 generating the zero-knowledge proof. The zero-knowledge proof has as inputs a proving key "pk" and a statement "w", in one embodiment. The proving key ("pk") is publicly available, in one embodiment. The statement "w" is what an entity (e.g., user) at the input node 102 wants to prove but to keep secret. The zero-knowledge proof has as inputs a proving key "pk", a random parameter "x", and a statement "w", in one embodiment. The random parameter "x" is publicly available, in one embodiment.

Step 1210 includes the input node 102 sending the zero-knowledge proof to the selected verifier network node 106e. The input node 102 may also send a verification key "vk" to the selected verifier network node 106e. Since the verification key "vk" may be publicly available, it is not required that the input node 102 send the verification key "vk" to the selected verifier network node 106e. The input node 102 may also send a random parameter "x" to the selected verifier network node 106e. Since the random parameter "x" may be publicly available, it is not required that the input node 102 send the random parameter "x" to the selected verifier network node 106e.

Step 1212 includes the selected verifier network node 106e verifying the zero-knowledge proof. In one embodiment, the selected verifier network node 106e executes a verifier algorithm that inputs the zero-knowledge proof, the verification key "vk", and the random parameter "x". The verifier algorithm outputs a binary value (e.g., TRUE, FALSE), in one embodiment.

Step 1214 includes a decision of whether the zero-knowledge proof is correct. This decision is made on based on whether the verifier algorithm outputs TRUE or FALSE, in one embodiment.

In the zero-knowledge proof is correct (e.g., TRUE), then step 1216 may be performed. Step 1216 includes the selected verifier network node 106e sending a result of TRUE to the result node 104.

In the zero-knowledge proof is incorrect (e.g., FALSE), then step 1218 may be performed. Step 1218 includes the selected verifier network node 106e sending a result of FALSE to the result node 104.

Referring now to FIG. 13, a communication system 1300 in which embodiments may be practiced is depicted. The communication system 1300 includes an input node 102, a result node 104, and several network nodes 106. Six network nodes 106a-106f are explicitly depicted in network 1310.

There may be other network nodes 106 in portion 1310a of the network, which are not depicted. In communication system 1300, network nodes 106a, 106e, and 106f has been selected to verify a zero-knowledge proof. Input node 102 performs a zero-knowledge proof (Prf), and sends the proof to each of the selected network nodes 102a, 106e and 106f. Each selected network node 102a, 106e and 106f verifies the proof. The selected network node 102a, 106e and 106f act as peers to verify the result, in one embodiment. In one embodiment, one of the network nodes 106 as a notary node to notarize the results. For example, network node 106e may receive Result_a from network node 106a and Result_a from network node 106f. Network node 106e may send a final result (e.g., Result_final) to the result node 104, after notarizing the results.

The zero-knowledge proof comprises a mathematical algorithm that inputs a proving key ("pk"), a random input ("x"), and a private statement ("w"), in one embodiment. The verification algorithm (V) inputs the random input ("x"), a verifying key ("vk") and the proof (pro, in one embodiment. In one embodiment, the zero-knowledge proof is based on zero-knowledge succinct non-interactive augments of knowledge (zk-SNARKs). Other protocols for zero-knowledge proofs may be used.

Referring now to FIG. 14, a flowchart of one embodiment of a process 1400 of verifying a zero-knowledge proof is depicted. The process 1400 may be used in communication system 1300. Step 1402 includes a result node 104 sending a zero-knowledge proof request to an input node 102. This request refers to a request for the input node 102 to perform the zero-knowledge proof. This request could be initiated in response to a user of the input node 102 wanting to proof some piece of information to an entity controlling the result node 104, without the user revealing the piece of information.

Step 1404 (Option A) includes either a result node 104 or an input node 102 sending one or more requests into the network 110 to look for a network node 106 that is capable of performing secure computes. In one embodiment, the one or more requests are sent to network nodes 106 that processed the request of step 1402. However, the request(s) may be sent to network nodes 106 that did not process the request of step 1402. One or more network nodes 106 may respond to the request of step 1404, indicating that the respective network node 106 is capable of performing secure computes.

Step 1405 (Option B) includes either a result node 104 or an input node 102 examining a header of one or more received packets to determine which network node (or nodes) 106 is/are capable of performing secure computes. In one embodiment, the one or more received packets are associated with the communication between the nodes in step 1402. However, the one or more packets are not required to be associated with the communication between the nodes in step 1402.

Step 1406 includes selecting multiple verifier network nodes 106. The selection may be based on the location of network nodes 106. For example, a network node 106 that is close to the input node 102 and/or the result node 104 may be selected. For the sake of discussion, network nodes 102a, 102e, and 102f are selected.

Step 1408 includes the input node 102 generating the zero-knowledge proof. The zero-knowledge proof has as inputs a proving key "pk" and a statement "w", in one embodiment. The zero-knowledge proof has as inputs a proving key "pk", a random parameter "x", and a statement "w", in one embodiment.

Step 1410 includes the input node 102 sending the zero-knowledge proof to each of the selected verifier nodes (e.g., network nodes 102a, 102e, and 102f). The input node 102 may also send a verification key "vk" to the selected verifier nodes. Since the verification key "vk" may be publicly available, it is not required that the input node 102 send the verification key "vk" to the selected verifier nodes. The input node 102 may also send a random parameter "x" to the selected verifier nodes. Since the random parameter "x" may be publicly available, it is not required that the input node 102 send the random parameter "x" to the selected verifier nodes.

Step 1412 includes the selected verifier nodes (e.g., network nodes 102a, 102e, and 102f) verifying the zero-knowledge proof. In one embodiment, each selected verifier node executes a verifier algorithm that inputs the zero-knowledge proof, the verification key "vk", and the random parameter "x". The verifier algorithm outputs a binary value (e.g., TRUE, FALSE), in one embodiment. Thus, for the sake of discussion each selected network node 102a, 102e, and 102f generates a separate result.

Step 1414 includes verifier network nodes sending their respective results to a notary node. The notary node may be one of the selected network nodes that verified the zero-knowledge proof. However, the notary node is not required to have verified the zero-knowledge proof. The notary node may be a network node, but is not required to be a network node. For the sake of discussion, network node 106e acts as the notary node, in one embodiment. Thus, network node 106a sends Result_a to network node 106e, and network node 106f sends Result_f to network node 106e, in one embodiment. These results are a binary value (e.g., TRUE, FALSE), in one embodiment.

Step 1416 includes the notary node notarizing the results to generate a trusted result. For example, network node 106e compares its result with Result_a and Result_f to verify that all results match (e.g., are all TRUE or all FALSE). Assuming that the results match, then the notary node sends the notarized result to the result node 104. The notarized result is either "TRUE" or "FALSE", in one embodiment.

If the results do not match (e.g., a mix of TRUE and FALSE), then the notary node implements a procedure for notarizing failing, in one embodiment. This may include determining whether there is a network node 106 that had an outlier result. For example, it may include determining whether one network node 106 produced a different result from all other network nodes 106. The notary node may also send a message to the result node 104 that the process of notarizing the results failed and that the zero-knowledge proof should be retried, but with a different set of network nodes.

In one embodiment, the notary node performs a "majority rules" algorithm in which the notary node selects as the final result what result is most prevalent. For example, if each network node provides a TRUE or FALSE result, the notary node determines whether there are more TRUE or FALSE results. In one embodiment, an odd number of network nodes are used to prevent ties. In another embodiment, an even number of network nodes are permitted, with the results being discarded in the event of a tie.

Referring now to FIG. 15, a communication system 1500 in which embodiments may be practiced is depicted. The communication system 1500 includes an input node 102, a result node 104, and several network nodes 106. Six network nodes 106a-106f are explicitly depicted in network 1510. There may be other network nodes 106 in portion 1510a of the network, which are not depicted. In communication system 1500, network nodes 106a, 106e, and 106f has been selected to verify a zero-knowledge proof. Input node 102 performs a zero-knowledge proof (Prf), and sends the proof to each of the selected network nodes 102a, 106e and 106f. Each selected network node 102a, 106e and 106f is a peer in a blockchain network, in one embodiment. Each selected network node 102a, 106e and 106f verifies the proof. Each selected network node 102a, 106e and 106f stores the result 1504 in a blockchain ledger. For example, network node 102a stores the result in blockchain ledger 1502a; network node 102e stores the result 1504 in blockchain ledger 1502e; and network node 102f stores the result 1504 in blockchain ledger 1502f The reference number 1502 may be used to refer to the blockchain ledger in general, without reference to a specific copy of the blockchain ledger. Thus, a different copy of the blockchain ledger 1502 is stored on each of the selected network node 102a, 106e and 106f, in one embodiment. The result node 104 is able to obtain the result 1504 from the blockchain ledger 1502 that is stored on at least one of the selected network nodes 106.

The zero-knowledge proof comprises a mathematical algorithm that inputs a proving key ("pk"), a random input ("x"), and a private statement ("w"), in one embodiment. The verification algorithm (V) inputs the random input ("x"), a verifying key ("vk") and the proof (pro, in one embodiment. In one embodiment, the zero-knowledge proof is based on zero-knowledge succinct non-interactive augments of knowledge (zk-SNARKs). Other protocols for zero-knowledge proofs may be used.

Referring now to FIG. 16, a flowchart of one embodiment of a process 1600 of verifying a zero-knowledge proof is depicted. The process 1600 may be used in communication system 1500. Step 1602 includes a result node 104 sending a zero-knowledge proof request to an input node 102. This request refers to a request for the input node 102 to perform the zero-knowledge proof. This request could be initiated in response to a user of the input node 102 wanting to proof some piece of information to an entity controlling the result node 104, without the user revealing the piece of information.

Step 1604 (Option A) includes either a result node 104 or an input node 102 sending one or more requests into the network 110 to look for a network node 106 that is capable of performing secure computes. In one embodiment, the one or more requests are sent to network nodes 106 that processed the request of step 1602. However, the request(s) may be sent to network nodes 106 that did not process the request of step 1602. One or more network nodes 106 may respond to the request of step 1604, indicating that the respective network node 106 is capable of performing secure computes.

Step 1605 (Option B) includes either a result node 104 or an input node 102 examining a header of one or more received packets to determine which network node (or nodes) 106 is/are capable of performing secure computes. In one embodiment, the one or more received packets are associated with the communication between the nodes in step 1602. However, the one or more packets are not required to be associated with the communication between the nodes in step 1602.

Step 1606 includes selecting multiple verifier network nodes 106. The selection may be based on the location of network nodes 106. For example, a network node 106 that is close to the input node 102 and/or the result node 104 may be selected. For the sake of discussion, network nodes 102a, 102e, and 102f are selected.

Step 1608 includes the input node 102 generating the zero-knowledge proof. The zero-knowledge proof has as inputs a proving key "pk" and a statement "w", in one embodiment. The zero-knowledge proof has as inputs a proving key "pk", a random parameter "x", and a statement "w", in one embodiment.

Step 1610 includes the input node 102 sending the zero-knowledge proof to each of the selected verifier nodes (e.g., network nodes 102a, 102e, and 102f). The input node 102 may also send a verification key "vk" to the selected verifier nodes. Since the verification key "vk" may be publicly available, it is not required that the input node 102 send the verification key "vk" to the selected verifier nodes. The input node 102 may also send a random parameter "x" to the selected verifier nodes. Since the random parameter "x" may be publicly available, it is not required that the input node 102 send the random parameter "x" to the selected verifier nodes.

Step 1612 includes the selected verifier nodes (e.g., network nodes 102a, 102e, and 1020 verifying the zero-knowledge proof. In one embodiment, each selected verifier node executes a verifier algorithm that inputs the zero-knowledge proof, the verification key "vk", and the random parameter "x". The verifier algorithm outputs a binary value (e.g., TRUE, FALSE), in one embodiment. Thus, for the sake of discussion each selected network node 102a, 102e, and 102f generates a separate result.

Step 1614 includes verifier network nodes (e.g., network nodes 102a, 102e, and 1020 acting as peer nodes in a blockchain network. The peer nodes may compare the results from the respective verifier network nodes to ensure that the result can be trusted to be correct. For example, the peer nodes may determine whether all of the results match (e.g., all TRUE or all FALSE). In the event that the results do not all match, then the process may perform a failure process.

In one embodiment, the peer nodes perform a "majority rules" algorithm in which the peer nodes select as the final result what result is most prevalent. For example, if each peer node provides a TRUE or FALSE result, the peer nodes determine whether there are more TRUE or FALSE results. In one embodiment, an odd number of peer nodes are used to prevent ties. In another embodiment, an even number of peer nodes are permitted, with the results being discarded in the event of a tie.

Step 1616 includes at least one of the verifier network nodes 106 recording the result in the blockchain ledger 1502. In one embodiment, each of the verifier network nodes 106 that verified the zero-knowledge proof stores the result in a copy of the blockchain ledger stored on the respective network node 106. For example, network node 106a stores the result in blockchain ledger 1502a, network node 106e stores the result in blockchain ledger 1502e, and network node 106f stores the result in blockchain ledger 1502f.

Step 1618 includes the result node 104 obtaining the result from the blockchain ledger 1502.

The technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Computer readable storage media is an example of a non-transitory computer-readable medium. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as radio frequency (RF) and other wireless media. Combinations of any of the above are also included within the scope of computer readable media.

In alternative embodiments, some or all of the software can be replaced by dedicated hardware control circuit components. For example, and without limitation, illustrative types of hardware control circuit components that can be used include Field-programmable Gate Arrays (FPGAs), Application-specific Integrated Circuits (ASICs), Application-specific Standard Products (ASSPs), System-on-a-chip systems (SOCs), Complex Programmable Control Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims.

What is claimed is:

1. A network device, comprising:
a memory comprising instructions; and
one or more processors in communication with the memory, wherein the one or more processors execute the instructions to:
receive and process routing requests in a network;
send an indication into the network that the network device is able to perform a secure compute;
perform the secure compute based on an input received via the network from an input device;
ensure that a result of the secure compute is trusted as a correct result of the secure compute; and
provide the trusted result of the secure compute to a result device connected to the network.

2. The network device of claim 1, wherein to ensure that the result of the secure compute is trusted the one or more processors execute the instructions to:
act as a peer to generate the trusted result with other network devices in the network that performed the secure compute; or
notarize the result of the secure compute from a plurality of network devices to produce the trusted result.

3. The network device of claim 1, wherein to provide the trusted result of the secure compute to the result device the one or more processors execute the instructions to record the trusted result in a blockchain ledger.

4. The network device of claim 1, wherein to ensure that the result of the secure compute is trusted the one or more processors execute the instructions in a trusted execution environment (TEE).

5. The network device of claim 1, wherein to send the indication into the network that the network device is able to perform the secure compute, the one or more processors execute the instructions to:
receive a query, via the network, whether the network device is able to perform the type of secure compute; and
respond to the query to indicate that the network device is able to perform the type of secure compute.

6. The network device of claim 1, wherein to send the indication into the network that the network device is able to perform the secure compute, the one or more processors execute the instructions to add information to a header of a packet when processing the routing requests.

7. The network device of claim 1, wherein the input from the input device comprises a zero-knowledge proof, and wherein to perform the secure compute the one or more processors execute the instructions to verify correctness of the zero-knowledge proof, based on a verification protocol.

8. The network device of claim 7, wherein to provide the trusted result of the secure compute to the result device the one or more processors execute the instructions to:
return a result of true to the result device in response to the zero-knowledge proof being correct; and
return a result of false to the result device in response to the zero-knowledge proof being incorrect.

9. The network device of claim 1, wherein to process routing requests in a network the one or more processors execute the instructions to route packets in accordance with an Open System Interconnection (OSI) layer 3 protocol or an Open System Interconnection (OSI) layer 2 protocol.

10. The network device of claim 9, wherein to provide the trusted result of the secure compute to the result device the one or more processors execute the instructions to:
the input received via the network from the input device is encrypted; and
the one or more processors execute the instructions to perform the secure compute without decrypting the input.

11. A method for secure computing implemented by a network device, comprising:
receiving and processing, by the network device, routing requests in a network;
sending an indication, by the network device, into the network that the network device is able to perform of secure compute;
performing the secure compute, by the network device, based on an input received via the network from an input device;
ensuring, by the network device, that a result of the secure compute is trusted as a correct result of the secure compute; and
providing the trusted result of the secure compute from the network device to a result device connected to the network.

12. The method of claim 11, wherein ensuring that the result of the secure compute is trusted comprises:
acting as a peer device to generate the trusted result with other network devices that performed the secure compute; or
recording the trusted result of the secure compute, by the network device, in a blockchain ledger.

13. The method of claim 11, further comprising sending a query to network devices in the network to seek one or more network devices that are qualified to perform the secure compute.

14. The method of claim 11, further comprising:
selecting multiple network devices to perform the secure compute; and
providing the input via the network to the multiple network devices selected.

15. The method of claim 11, wherein the input from the input device comprises a zero- knowledge proof, and wherein performing the secure compute based on the input from the input device comprises verifying correctness of the zero-knowledge proof based on a verification protocol.

16. The method of claim 11, wherein the input received via the network from the input device is encrypted, and wherein performing the secure compute comprises performing the secure compute without decrypting the input.

17. A non-transitory computer-readable medium storing computer instructions for secure computing, that when executed by one or more processors, cause the one or more processors to:
  receive and process routing requests in a network by a network device;
  send an indication into the network that the network device is able to perform a type of secure compute;
  perform the type of secure compute based on an input received via the network from an input device;
  ensure that a result of the secure compute is trusted as a correct result of the secure compute; and
  provide the trusted result of the secure compute to one or more result devices connected to the network.

18. The non-transitory computer-readable medium of claim 17, wherein the computer instructions further cause the one or more processors to obtain the result of the secure compute from a blockchain ledger.

19. The non-transitory computer-readable medium of claim 17, wherein the computer instructions further cause the one or more processors to:
  select the network device from among multiple network devices that indicate that the respective network device is qualified to perform the type of secure compute; and
  provide the input to the network device selected.

20. The non-transitory computer-readable medium of claim 17, wherein the computer instructions further cause the one or more processors to:
  compare a result of the secure compute from each of multiple selected network devices; and
  select the trusted result based on the result of the secure compute from each of the multiple selected network devices.

* * * * *

UNITED STATES PATENT AND TRADEMARK OFFICE
CERTIFICATE OF CORRECTION

PATENT NO. : 11,943,359 B2
APPLICATION NO. : 17/359108
DATED : March 26, 2024
INVENTOR(S) : Fei Liu et al.

Page 1 of 1

It is certified that error appears in the above-identified patent and that said Letters Patent is hereby corrected as shown below:

In the Claims

Column 25, Claim 5, Lines 64-67, through Column 26, Lines 1-5, should read:
5. The network device of claim 1, wherein to send the indication into the network that the network device is able to perform the secure compute, the one or more processors execute the instructions to:
    receive a query, via the network, whether the network device is able to perform the secure compute; and
    respond to the query to indicate that the network device is able to perform the secure compute.

Column 27, Claim 17, Lines 11-22, through Column 28, Lines 1-2, should read:
17. A non-transitory computer-readable medium storing computer instructions for secure computing, that when executed by one or more processors, cause the one or more processors to:
    receive and process routing requests in a network by a network device;
    send an indication into the network that the network device is able to perform a secure compute;
    perform the secure compute based on an input received via the network from an input device;
    ensure that a result of the secure compute is trusted as a correct result of the secure compute; and
    provide the trusted result of the secure compute to one or more result devices connected to the network.

Column 28, Claim 19, Lines 7-12, should read:
19. The non-transitory computer-readable medium of claim 17, wherein the computer instructions further cause the one or more processors to:
    select the network device from among multiple network devices that indicate that the respective network device is qualified to perform the secure compute; and
    provide the input to the network device selected.

Signed and Sealed this
Fourth Day of June, 2024

Katherine Kelly Vidal
*Director of the United States Patent and Trademark Office*